US011169972B2

(12) United States Patent
Lewis et al.

(10) Patent No.: US 11,169,972 B2
(45) Date of Patent: *Nov. 9, 2021

(54) HANDLING DATA EXTENT SIZE ASYMMETRY DURING LOGICAL REPLICATION IN A STORAGE SYSTEM

(71) Applicant: NetApp Inc., Sunnyvale, CA (US)

(72) Inventors: Blake Lewis, Los Altos Hills, CA (US); John K. Edwards, Sunnyvale, CA (US); Vijay Deshmukh, Mountain View, CA (US); Kapil Kumar, Mountain View, CA (US); Rajesh Desai, Sunnyvale, CA (US)

(73) Assignee: NetApp Inc., San Jose, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 16/254,921

(22) Filed: Jan. 23, 2019

(65) Prior Publication Data

US 2019/0155793 A1    May 23, 2019

Related U.S. Application Data

(63) Continuation of application No. 13/237,760, filed on Sep. 20, 2011, now Pat. No. 10,223,375.

(51) Int. Cl.
*G06F 16/182* (2019.01)
*G06F 3/06* (2006.01)
*G06F 11/20* (2006.01)

(52) U.S. Cl.
CPC .......... *G06F 16/1844* (2019.01); *G06F 3/067* (2013.01); *G06F 3/0608* (2013.01); *G06F 3/0641* (2013.01); *G06F 11/2094* (2013.01); *G06F 11/2097* (2013.01)

(58) Field of Classification Search
CPC .. G06F 16/1844; G06F 3/0608; G06F 3/0641; G06F 3/067
See application file for complete search history.

(56) References Cited

U.S. PATENT DOCUMENTS 5,832,525 A * 11/1998 Wong .................. G06F 16/1724
6,654,772 B1   11/2003 Crow et al.
7,603,529 B1   10/2009 MacHardy et al.
(Continued)

OTHER PUBLICATIONS

International Search Report and Written Opinion for Application No. PCT/US2012/054925 dated Feb. 26, 2013, 7 pages.
(Continued)

*Primary Examiner* — Neveen Abel Jalil
*Assistant Examiner* — Hubert Cheung
(74) *Attorney, Agent, or Firm* — Cooper Legal Group, LLC

(57) ABSTRACT

A technique to name data is disclosed to allow preservation of storage efficiency over a link between a source and a destination in a replication relationship as well as in storage at the destination. The technique allows the source to send named data to the destination once and refer to it by name multiple times in the future, without having to resend the data. The technique also allows the transmission of data extents to be decoupled from the logical containers that refer to the data extents. Additionally, the technique allows a replication system to accommodate different extent sizes between replication source and destination while preserving storage efficiency.

20 Claims, 13 Drawing Sheets

(56) References Cited

U.S. PATENT DOCUMENTS

| | | |
|---|---|---|
| 7,669,022 B2 | 2/2010 | Maruyama et al. |
| 7,865,677 B1 | 1/2011 | Duprey et al. |
| 8,478,731 B1 | 7/2013 | Throop et al. |
| 8,639,658 B1 | 1/2014 | Kumaresan et al. |
| 8,683,153 B1 | 3/2014 | Long et al. |
| 8,775,388 B1 | 7/2014 | Chen et al. |
| 8,850,130 B1* | 9/2014 | Aron ............... G06F 3/0641 711/150 |
| 8,918,378 B1* | 12/2014 | Faith ............... G06F 3/065 707/695 |
| 8,977,812 B1 | 3/2015 | Chen et al. |
| 8,990,527 B1* | 3/2015 | Linstead ............... G06F 3/0647 711/162 |
| 9,009,106 B1 | 4/2015 | Aron et al. |
| 9,009,437 B1* | 4/2015 | Bjornsson ............... G06F 3/0689 711/170 |
| 9,747,287 B1* | 8/2017 | Bhardwaj ............... G06F 3/0685 |
| 2003/0217082 A1 | 11/2003 | Kleiman et al. |
| 2004/0254907 A1 | 12/2004 | Crow et al. |
| 2006/0179083 A1 | 8/2006 | Kulkarni et al. |
| 2006/0242283 A1 | 10/2006 | Shaik et al. |
| 2006/0259728 A1 | 11/2006 | Chandrasekaran et al. |
| 2007/0156957 A1 | 7/2007 | MacHardy et al. |
| 2008/0120303 A1* | 5/2008 | Selkirk ............... G06F 3/0667 |
| 2009/0254468 A1* | 10/2009 | Acedo ............... H04L 67/16 705/35 |
| 2009/0254636 A1* | 10/2009 | Acedo ............... G06F 3/067 709/220 |
| 2011/0040728 A1* | 2/2011 | Akirav ............... G06F 11/2094 707/634 |
| 2011/0145523 A1 | 6/2011 | Gupta et al. |
| 2012/0136841 A1* | 5/2012 | Ambat ............... G06F 16/215 707/692 |
| 2012/0216009 A1* | 8/2012 | Benhase ............... G06F 3/0605 711/206 |
| 2013/0036091 A1 | 2/2013 | Provenzano et al. |
| 2013/0073522 A1* | 3/2013 | Chen ............... G06F 16/182 707/687 |
| 2013/0103920 A1* | 4/2013 | Wei ............... G06F 16/13 711/173 |
| 2013/0173878 A1* | 7/2013 | Benhase ............... G06F 3/0605 711/162 |
| 2016/0070495 A1* | 3/2016 | Periyagaram ............... G06F 3/0619 711/159 |

OTHER PUBLICATIONS

Supplementary European Search Report for Application No. EP12833960 dated Jun. 8, 2015, 6 pages.

* cited by examiner

HANDLING DATA EXTENT SIZE ASYMMETRY DURING LOGICAL REPLICATION IN A STORAGE SYSTEM

RELATED APPLICATIONS

This application claims priority to and is a continuation of U.S. application Ser. No. 13/237,760, filed on Sep. 20, 2011, now allowed, titled "HANDLING DATA EXTENT SIZE ASYMMETRY DURING LOGICAL REPLICATION IN A STORAGE SYSTEM," which is incorporated herein by reference.

FIELD OF THE INVENTION

At least one embodiment of the present invention pertains to data storage systems, and more particularly, to a technique for handling data extent size asymmetry during logical replication in a storage system.

BACKGROUND

A network storage controller is a processing system that is used to store and retrieve data on behalf of one or more hosts on a network. A storage controller operates on behalf of one or more hosts to store and manage data in a set of mass storage devices, such as magnetic or optical storage-based disks or tapes. Some storage controllers are designed to service file-level requests from hosts, as is commonly the case with file servers used in network attached storage (NAS) environments. Other storage controllers are designed to service extent-level requests from hosts, as with storage controllers used in a storage area network (SAN) environment. In this description, the term "data extent," or simply "extent," is henceforth used to refer to the smallest unit of data that can be independently identified and manipulated by a file system in a storage system. The term "data extent" or simply "extent" is essentially synonymous with the term "data block" or simply "block" for purposes of this description.

Still other storage controllers are capable of servicing both file-level requests and extent-level requests, as is the case with certain storage controllers made by NetApp, Inc. of Sunnyvale, Calif.

One common application of storage controllers is data replication. Mirroring is a form of replication, in which a given data set at a source is replicated "exactly" (at least insofar as its users can see) at a destination, which is often geographically remote from the source. The replica data set created at the destination is called a "mirror" of the original data set. Mirroring typically involves the use of at least two storage controllers, e.g., one at the source and another at the destination, which communicate with each other through a computer network or other type of data interconnect to create the mirror.

When replicating a data set, such as a volume, the replica usually does not need to be an exact copy of the original; however, it should be close enough in its outward appearance to its users so that it is effectively the same as the original. In many storage systems, files and directories are a major part of what a user sees when looking at a volume. However, a volume usually also has other properties that can impact replication, such as how much space it occupies. A storage administrator is often concerned with these other properties, because provisioning adequate storage capacity is one of a storage administrator's main responsibilities.

Storage efficiency techniques such as compression and data extent sharing for deduplication can enable a volume effectively to hold far more data than the space it actually uses. Unless this efficiency is preserved during replication, however, a resulting replica may inflate to an intolerably large size and may require an inordinate amount of time to transfer from source to destination. In extreme but plausible cases, it may not be possible to create a replica at all, due to such data inflation. Yet preserving storage efficiency attributes such as extent sharing and compression across replicas has proven to be a significant challenge.

SUMMARY

This summary is provided to introduce in a simplified form certain concepts that are further described in the Detailed Description below and the drawings. This summary is not intended to identify essential features of the claimed subject matter or to limit the scope of the claimed subject matter.

The techniques introduced here enable logical replication of data from a source to a destination while preserving the effects of storage efficiency operations applied at the source. In particular, these techniques enable extent sharing to be preserved across replicas through a mechanism of data naming. Conventional logical replication sends data from a source to a destination anonymously. This makes it difficult for the source to refer to data which already exists on the destination.

Therefore, to allow preserving storage efficiency over the link between the source and destination as well as in storage at the destination, a mechanism to name replicated data is introduced here. This mechanism allows a source to send named data to the destination once and refer to it by name multiple times in the future, without having to resend the data. This approach also allows the transmission of data extents to be decoupled from the actual files (or other logical containers) that refer to those extents. The source therefore has considerable freedom in sending the data extents in an order that it finds convenient.

Additionally, the techniques introduced here enable a replication system to accommodate different extent sizes between replication source and destination (i.e., extent size asymmetry) while preserving storage efficiency. This allows the source and the destination to run different types or versions of file systems or storage operating systems. It also can enable additional space savings to be achieved on the destination, such as where the source deduplicates data that is uncompressed and the destination preserves the deduplication and compresses the data.

Other aspects of the technique will be apparent from the accompanying figures and detailed description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Replication can be done at a physical extent level or at a logical extent level, the former being referred to as "physical replication" and the latter being referred to as "logical replication." To understand the difference, consider that in certain storage systems, each data extent in a given set of data (e.g., a file) can be represented by both a physical extent which is referenced by use of a physical extent pointer, and by a logical extent which is referenced pointed to by a corresponding logical extent pointer. The logical extent and the physical extent are actually the same extent. However, the physical extent pointer indicates the actual physical location of the data extent on a storage medium, whereas the logical extent pointer indicates the logical position of the data extent within the data set (e.g., a file) relative to other data extents.

Physical replication, the replication process creates a replica that has the identical structure of physical extent pointers as the original data set. In logical replication, the replica has the identical structure of logical extent pointers as the original data set but may (and typically does) have a different structure of physical extent pointers than the original data set. These two different types of replication have different implications and consequences under certain conditions.

For various reasons it may be more desirable to perform logical replication in a given storage system rather than physical replication. Consequently, the embodiments described below are based on logical replication.

I. Overview

A. System Architecture

Figure 1:
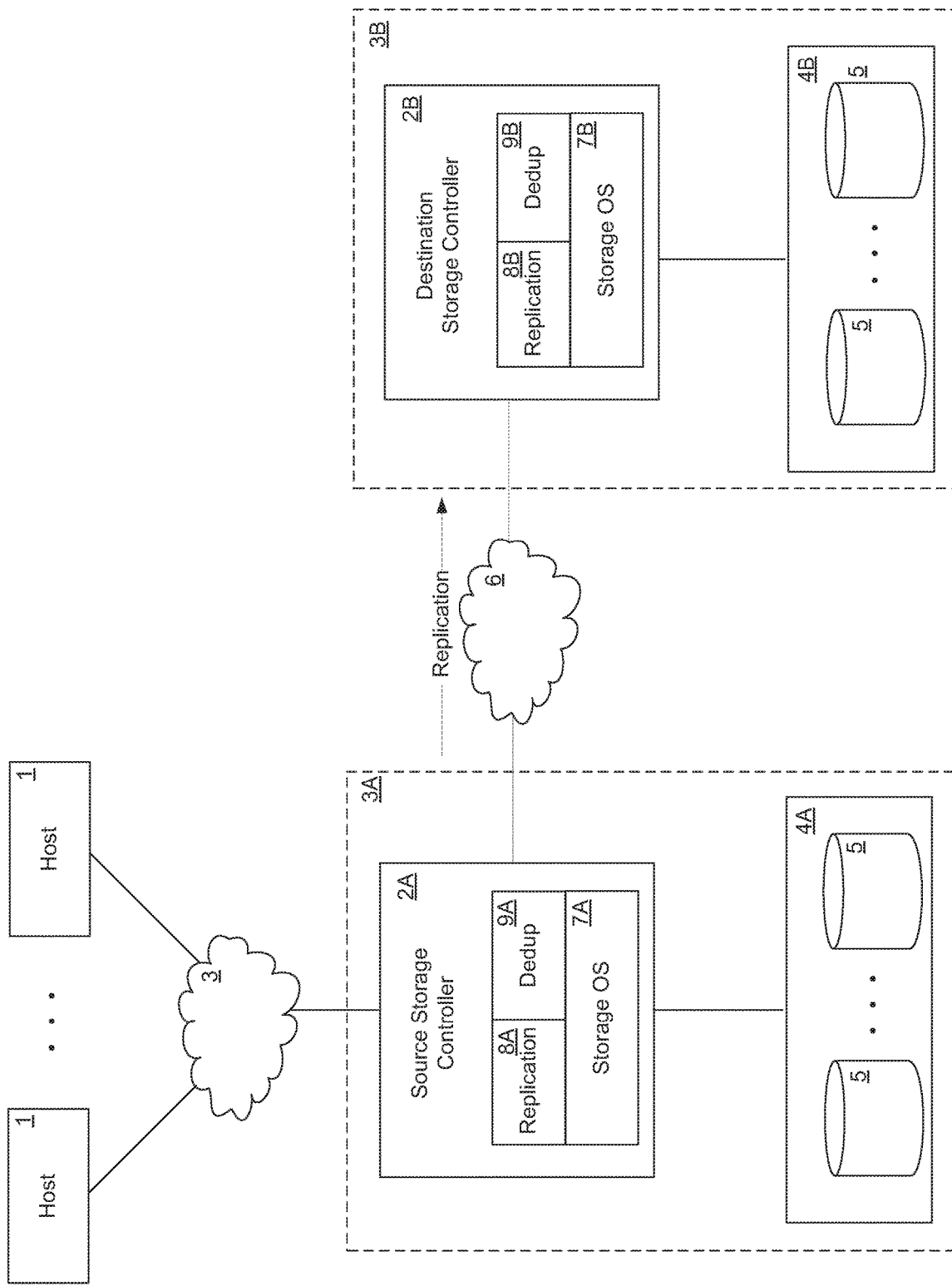
FIG. 1 shows a network storage system in which the techniques introduced here can be implemented.

FIG. 1 shows a network storage system in which the techniques being introduced here and be implemented. In FIG. 1 a source is coupled to a destination through an interconnect 6. The source contains source storage controller 2A coupled to a source storage subsystem 4A and to a set of hosts 1 through an interconnect 3. Interconnects 3 and 6 each can be, for example, a local area network (LAN), wide area network (WAN), metropolitan area network (MAN), global area network such as the Internet, a Fibre Channel fabric, or any combination of such interconnects. Each of the hosts 1 may be, for example, a conventional personal computer (PC), server-class computer, workstation, handheld computing/communication device, or the like. Interconnects 3 and 6 can be, but are not necessarily, the same interconnect.

Storage of data in the source storage subsystem 4A is managed by source storage controller 2A. Source storage controller 2A and source storage subsystem 4A are collectively referred to as the source. Source storage controller 2A receives and responds to various read and write requests from the hosts 1, remaining to data stored in, or to be stored in, storage subsystem 4A. Storage subsystem 4A includes a number of nonvolatile mass storage devices 5, which can be, for example, conventional magnetic or optical disks or tape drives, non-volatile solid-state memory such as flash memory or solid-state drives (SSDs), or any combination thereof. The mass storage devices 5 in storage subsystem 4A can be organized as a Redundant Array of Inexpensive Disks (RAID), in which case the storage controller 2 accesses the storage subsystem 4 using a RAID algorithm for redundancy.

Source storage controller 2A is connected to destination storage controller 2B through interconnect 6 for purposes of mirroring data. Interconnect 6 may include one or more devices and/or networks. The source storage controller 2A includes a storage operating system 7A which is responsible for managing storage of data in the source storage subsystem 4A, servicing requests from hosts 1, and performing various other storage related operations. The source storage controller 2A also includes a replication module 8A and a deduplication module 9A, which operate logically on top of the storage operating system 7A. The replication module 8A in the source storage controller 2A operates in cooperation with a remote replication module 8B in the destination storage controller 2B, to perform logical replication of data stored in the source storage subsystem 4A to destination storage system 4B. In other embodiments, one or both of the replication module 8A and the deduplication module 9A may be implemented as elements of storage operating system 7A.

The destination storage controller 2B includes storage operating system 7B to control storage related operations on the destination storage controller 2B, as well as replication module 8B and deduplication module 9B operating logically on top of storage operating system 7B. In other embodiments, one or both of the replication module 8B and the deduplication module 9B may be implemented as elements of storage operating system 7B. The destination storage controller 2B and the destination storage subsystem 4B collectively make up the destination.

Replication module 8B works in cooperation with replication module 8A to mirror data from the source to the destination.

Each of the various modules shown in FIG. 1 (i.e., storage operating systems 7A and 7B, replication modules 8A and 8B, and deduplication modules 9A and 9B) can be implemented in pure hardware (e.g., specially-designed dedicated circuitry such as one or more application-specific integrated circuits (ASICs)), or in programmable circuitry appropriately programmed with software and/or firmware, or in a combination of pure hardware and programmable circuitry.

Storage controllers 2A and 2B each may be, for example, a storage server that provides file-level data access services to hosts, such as commonly done in a NAS environment, or extent-level data access services such as commonly done in a SAN environment, or both file-level and extent-level data access services to hosts. Further, although the storage controller 2A or 2B is illustrated as a single unit in FIG. 1, it can have a distributed architecture. For example, a storage controller 2A or 2B can be designed in the form of a physically separate network module (e.g., "N-blade") and disk module (e.g., "D-blade") (not shown), which communicate with each other over a physical interconnect. Such an architecture allows convenient scaling, such as by deploying two or more N-modules and two or more D-modules, all capable of communicating with each other through the interconnect.

Figure 2:
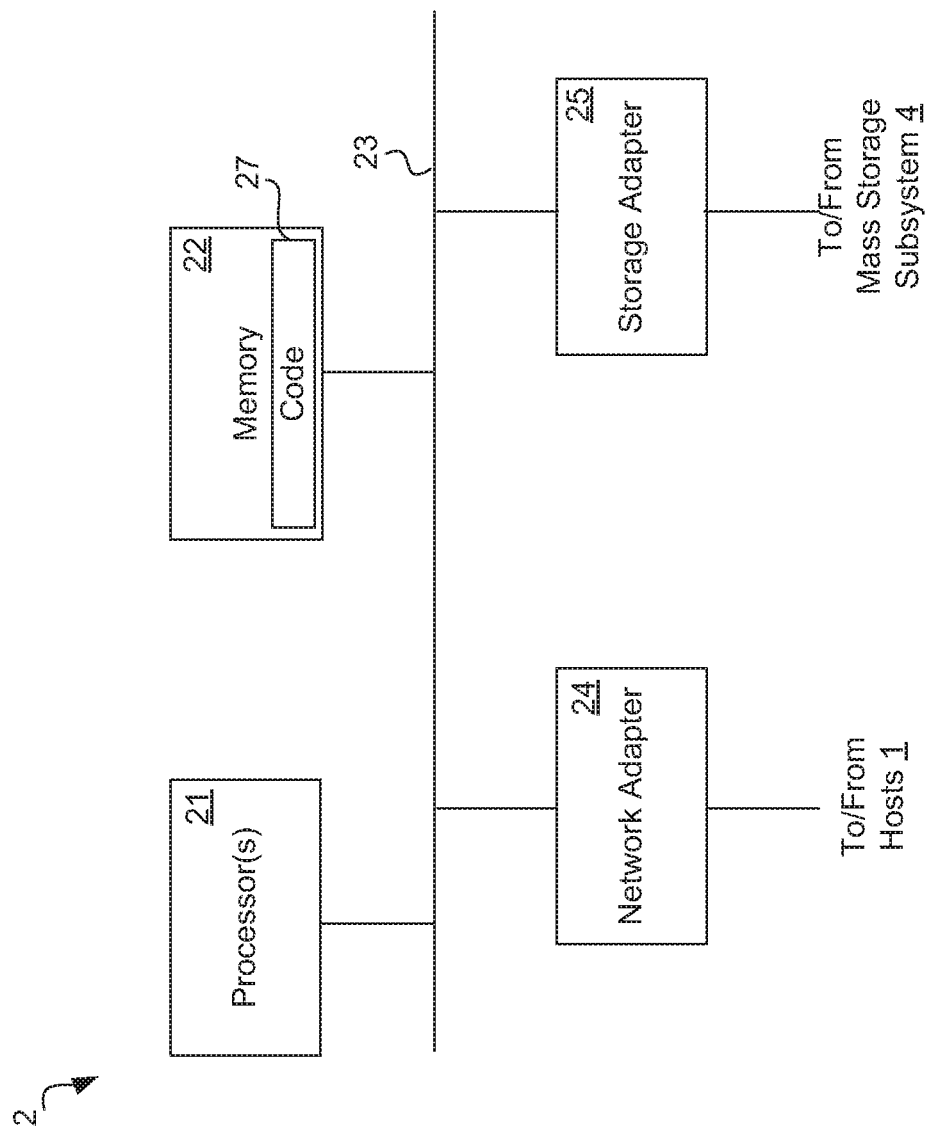
FIG. 2 is a high-level extent diagram showing an example of the architecture of a storage controller.

FIG. 2 is a high-level extent diagram showing an example of the architecture of a storage controller 2, which can represent storage controller 2A or 2B. The storage controller 2 includes one or more processors 21 and memory 22 coupled to an interconnect 23. The interconnect 23 shown in FIG. 2 is an abstraction that represents any one or more separate physical buses, point-to-point connections, or both, connected by appropriate bridges, adapters, or controllers. The interconnect 23, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire", and/or any other suitable form of physical connection.

The processor(s) 21 is/are the central processing unit (CPU) of the storage controller 2 and, thus, control the overall operation of the storage controller 2. In certain embodiments, the processor(s) 21 accomplish this by executing software or firmware stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 22 is or includes the main memory of the storage controller 2. The memory 22 represents any form of random access memory (RAM), read-only memory (ROM), flash memory, or the like, or a combination of such devices. In use, the memory 22 may contain, among other things, software or firmware code 27 for use in implementing at least some of the techniques introduced herein.

Also connected to the processor(s) 21 through the interconnect 23 are a network adapter 24 and a storage adapter 25. The network adapter 24 provides the storage controller 2 with the ability to communicate with remote devices, such as hosts 1, over the interconnect 3 and may be, for example, an Ethernet adapter or Fibre Channel adapter. The storage adapter 25 allows the storage controller 2 to access a storage subsystem, such as storage subsystem 4A or 4B, and may be, for example, a Fibre Channel adapter or SCSI adapter.

Figure 3:
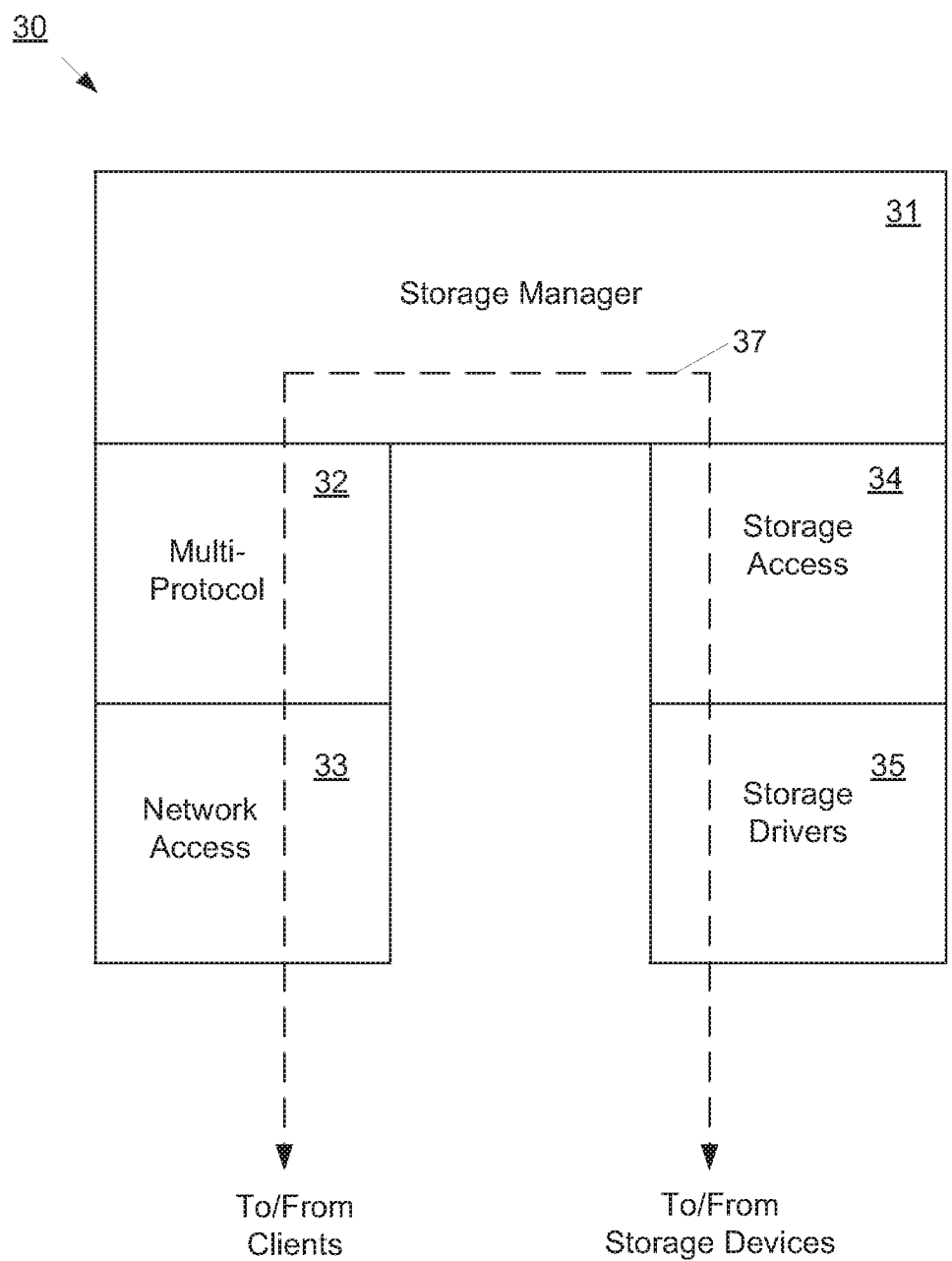
FIG. 3 is a functional extent diagram illustrating the elements of a storage operating system.

FIG. 3 illustrates an example of a storage operating system, which may represent storage operating system 7A or 7B. In the embodiment shown in FIG. 3, the storage operating system 30 includes several modules, or "layers". These layers include a storage manager 31, which is the core functional element of the storage operating system 30. The storage manager 31 imposes a structure (e.g., a hierarchy) on the data managed by its host storage server, and services read and write requests from clients.

To allow the storage server to communicate over a network (e.g., with clients), the storage operating system 30 also includes a multi-protocol layer 32 and a network access layer 33, which operate logically "under" the storage manager 31. The multi-protocol 32 layer implements various higher-level network protocols, such as Network File System (NFS), Common Internet File System (CIFS), Hypertext Transfer Protocol (HTTP), Internet small computer system interface (iSCSI), and backup/mirroring protocols. The network access layer 33 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

To allow the storage server to communicate with a local storage subsystem, the storage operating system 30 includes a RAID layer 34 and an associated storage driver layer 35, logically under the storage manager 31. The RAID layer 34 implements a higher-level RAID algorithm, such as RAID-4, RAID-5, RAID-6 or RAID-DP. The storage driver layer 35 implements a lower-level storage device access protocol, such as Fibre Channel Protocol (FCP) or small computer system interface (SCSI). Also shown is the data path 37 between the clients (hosts) 1 and storage devices 5.

In the illustrated embodiment, the storage operating system 30 is shown as being monolithic in architecture. In alternative embodiments, however, the storage operating system 30 could have a distributed architecture. For example, storage manager, 31, the RAID layer 34 and the storage drivers 35 could be combined into a module or blade (e.g., a "D-blade") that is responsible for data management functions, while the multi-protocol layer 32 and the network access layer 33 are grouped into another module or blade (e.g., "N-blade") that is responsible for network communications. In such an embodiment, the N-module and the D-module can communicate through a special-purpose communication link and protocol. Each of the above-mentioned components of the storage operating system 20 can be implemented in the form of special-purpose hardware (circuitry), programmable circuitry, or a combination thereof.

B. File System Structure and Functionality

It is useful now to consider how data can be structured and organized in a file system by storage controllers 2A and 2B according to certain embodiments. The term "file system" is used herein only to facilitate description and does not imply that the stored data must be stored in the form of "files" in a traditional sense; that is, a "file system" as the term is used herein can store data in logical units (LUNs) and/or in any other type(s) of logical containers of data.

In at least one embodiment, data is stored in the form of volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more directories, subdirectories, qtrees, files and/or files. An "aggregate" is a pool of storage, which combines one or more physical mass storage devices (e.g., disks) or parts thereof into a single logical storage object. An aggregate contains or provides storage for one or more other logical data sets at a higher level of abstraction, such as volumes. A "qtree" is special type of directory that has a storage space limit or quota associated with it.

In certain embodiments, an aggregate uses a physical volume block number (PVBN) address space that defines the storage space of data extents provided by the storage devices of the physical volume, and each volume uses a virtual volume block number (VVBN) address space to organize those extents into one or more higher level objects, such as directories, subdirectories, qtrees and files. A PVBN, therefore, is an address of a physical extent in the aggregate. A VVBN is an address of an extent in a volume (the same extent as referenced by the corresponding PVBN), i.e., the offset of the extent within a file that represents the volume. Knowledge of all of the VVBNs and PVBNs is maintained by the storage operating system in each storage controller. Each VVBN space is an independent set of values that corresponds to locations within a directory, qtree or file, which are translated by the storage access layer 34 to device block numbers (DBNs) on a physical storage device.

Each volume can be a separate file system that is "mingled" with other volumes onto a common set of storage in the aggregate by the storage operating system. A RAID layer in the storage operating system 30 builds a RAID topology structure for the aggregate that guides each volume when performing write allocation. The RAID layer also presents a PVBN-to-DBN mapping to the storage manager 31.

In addition, the storage operating system maintains a logical extent number for each data extent. The logical extent numbers are called file block numbers (FBNs). Each FBN indicates the logical position of the extent within a file, relative to other extents in the file, i.e., the offset of the extent within the file. Note that the term "file" as used herein can mean any named logical container of data that can be composed of one or more smaller identifiable units of data, such as data extents. For example, FBN 0 represents the first logical extent in a file, FBN 1 represents the second logical extent in a file, FBN n-1 represents the nth logical extent in a file, etc. Note that the PVBN and VVBN of a data extent are independent of the FBN(s) that refer to that extent.

In certain embodiments, each file is represented in a storage controller on the form of a hierarchical structure called a "buffer tree". A buffer tree is a hierarchical structure used to store data and metadata of a file, including pointers for use in locating the data extents of the file. A buffer tree includes one or more levels of indirect data extents (called "L1 extents", "L2 extents", etc.), each of which contains one or more pointers to lower-level indirect extents and/or to the direct extents (called "L0 extents") of the file. All of the data in the file is stored only at the lowest level (L0) extents.

The root of a buffer tree is the "inode" of the file. An inode is a metadata container that is used to store metadata about the file, such as ownership, access permissions, file size, file type, and pointers to the highest level of indirect extents for the file. Each file has its own inode. The inode is stored in a separate inode file, which may itself be structured as a buffer tree.

Figure 4:
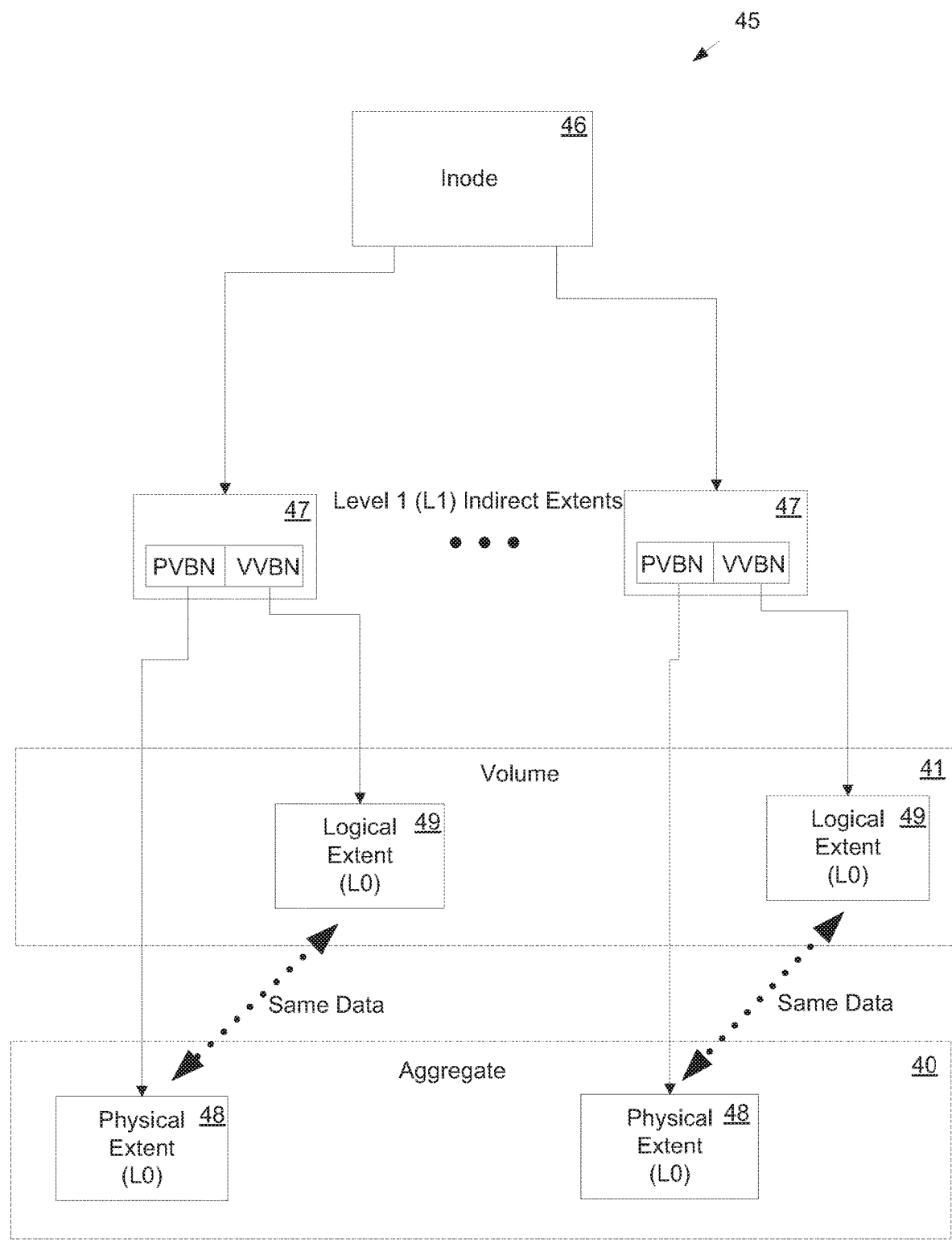
FIG. 4 shows an example of a buffer tree.

FIG. 4 shows an example of a buffer tree 45 of a file. The file is assigned an inode 46, which references Level 1 (L1) indirect extents 47. Each indirect extent 47 stores at least one PVBN and a corresponding VVBN for each PVBN. There is a one-to-one mapping between each VVBN and PVBN. Note that a VVBN is a logical extent number in a volume, which is a virtual number for addressing; but there is only one copy of the L0 data extent physically stored. Also, to simplify description, only one PVBN-VVBN pair is shown in each indirect extent 47 in FIG. 4; however, an actual implementation would likely include multiple/many PVBN-VVBN pairs in each indirect extent 47. Each PVBN references a physical extent 48 in a storage device (i.e., in the aggregate 30) and the corresponding VVBN represents the corresponding logical extent 49 in a file that represents the volume (called the "container file") 41. Physical extents 48 and logical extents 49 are actually the same L0 data for any particular PVBN-VVBN pair, however, they are accessed in different ways: The PVBN is accessed directly in the aggregate 40, while the VVBN is accessed virtually via the volume container file 41.

Figure 5:
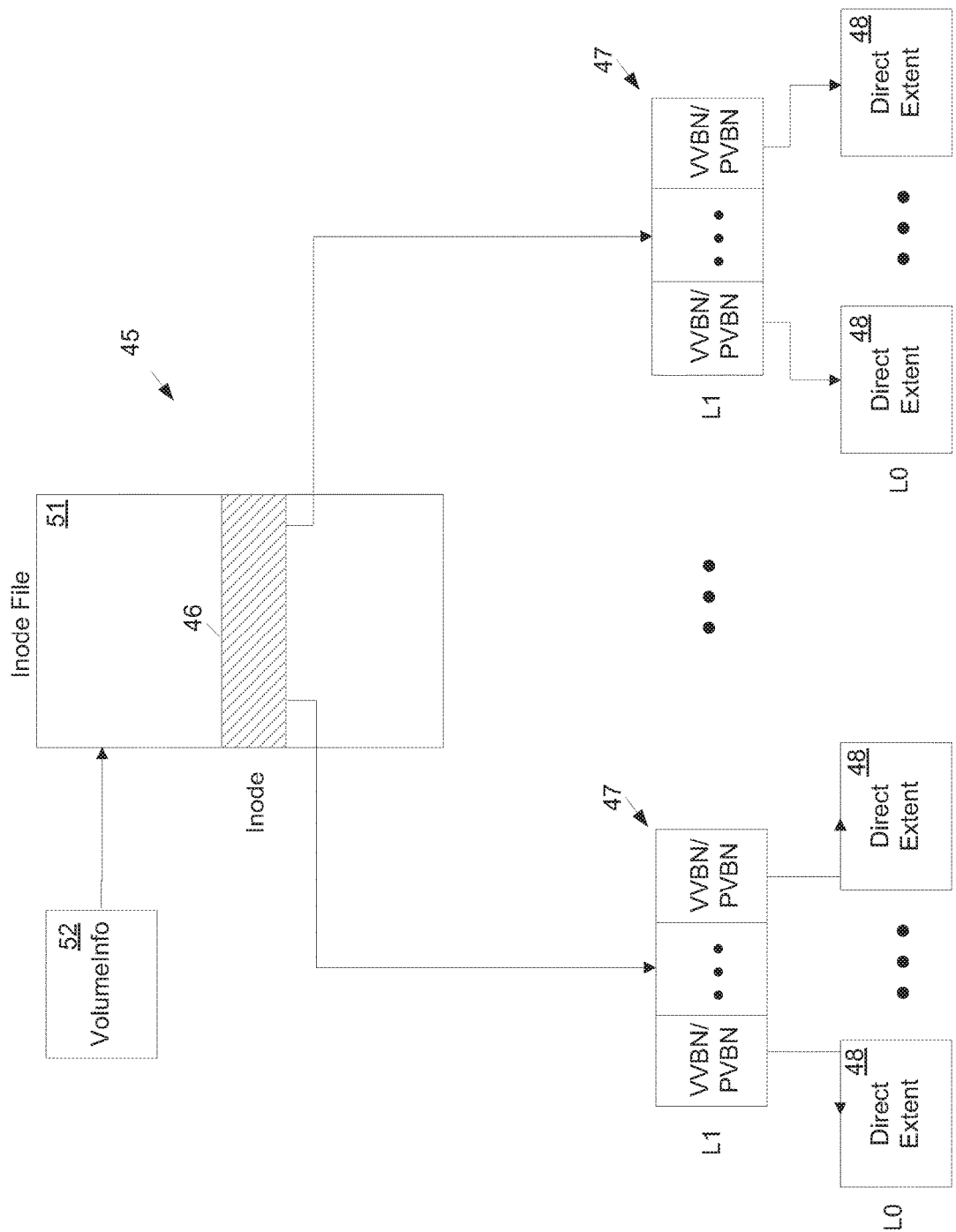
FIG. 5 shows the relationship between inodes, an inode file and a buffer tree.

Referring now to FIG. 5, for each volume managed by a storage server, the inodes of the files and directories in that volume are stored in a separate inode file 51. A separate inode file 51 is maintained for each volume. Each inode 46 in an inode file 51 is the root of the buffer tree 45 of a corresponding file. The location of the inode file 51 for each volume is stored in a Volume Information ("VolumeInfo") extent 52 associated with that volume. The VolumeInfo extent 52 is a metadata container that contains metadata that applies to the volume as a whole. Examples of such metadata include, for example, the volume's name, type, size, any space guarantees to apply to the volume, and the VVBN of the inode file of the volume.

In at least one conventional asynchronous data mirroring technique, the replication module first generates a persistent point-in-time image ("snapshot") of a data set to be replicated at the source (e.g., a qtree), and then sends that snapshot to the replication module; this data is referred to as the baseline, or baseline snapshot. Subsequently, from time to time, the replication module executes a mirror update process (which may be at the request of the replication module). To do so, the replication module takes an update snapshot of the data set, identifies any data extents (FBNs) that have been modified since the last snapshot, whichever is later, and sends those changed extents to the destination.

C. Extent Sharing (Deduplication)

Figure 6A:
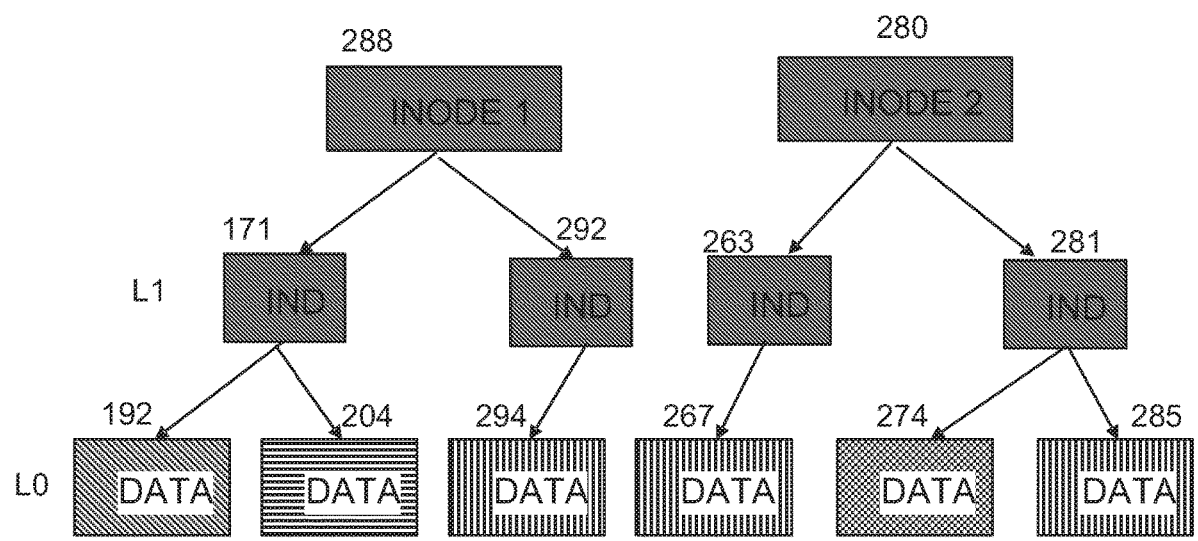
FIGS. 6A and 6B illustrate an example of two buffer trees before and after deduplication of data extents, respectively.
Figure 6B:
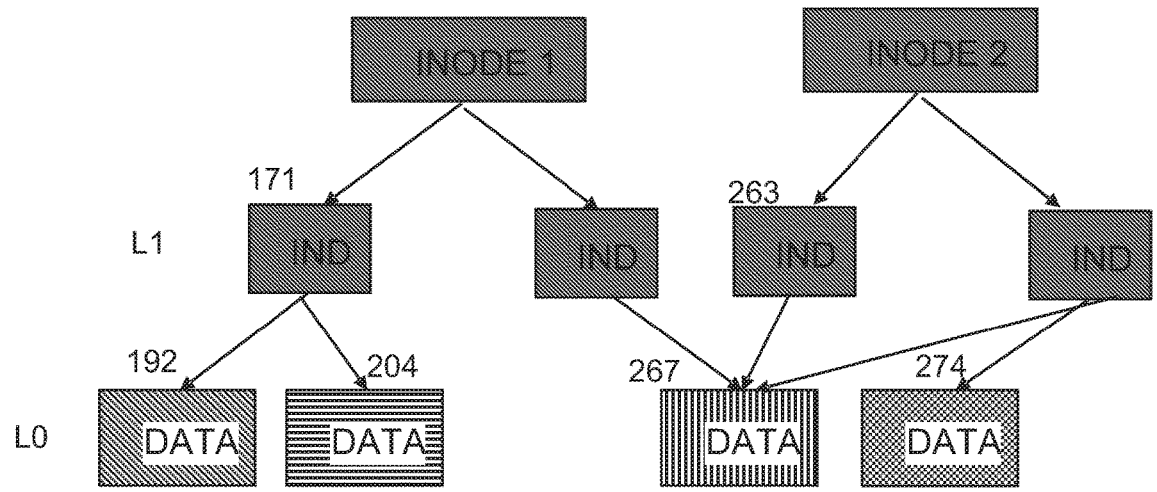

Now consider the process of deduplication. FIGS. 6A and 6B show an example of the buffer trees of two files, where FIG. 6A shows the buffer trees before deduplication and FIG. 6B shows the buffer trees after deduplication. The root extents of the two files are Inode 1 and Inode 2, respectively. The three-digit numerals in FIGS. 6A and 6B are the PVBNs of the various extents. The fill patterns of the direct (L0) extents in these two figures represents the data content of those extents, such that extents shown with identical fill pattern are identical data extents. It can be seen from FIG. 6A, therefore, that the data extents with PVBNs 294, 267 and 285 are identical.

The result of deduplication is that these three data extents are, in effect, coalesced into a single data extent, identified by PVBN 267, which is now shared by the indirect extents that previously pointed to data extent 294 and data extent 285. Further, it can be seen that data extent 267 is now shared by both files. In a more complicated example, data extents can be coalesced so as to be shared between volumes or other types of logical containers. This coalescing operation involves modifying the indirect extents that pointed to data extents 294 and 285, and so forth, up to the root node. In a write out-of-place file system, that involves writing those modified extents to new locations on disk.

To identify duplicate data extents, a hash function, such as MD5, SHA-256 or SHA-512, can be applied to all used (unfree) data extents in the data set to be deduplicated. The output of the hash function is a value for each data extent, called a fingerprint, where identical data extents will always have the same fingerprint. By comparing the fingerprints during a subsequent deduplication process, potential duplicate data extents can be identified (data extents with identical fingerprints are potential duplicates). Once potential duplicate data extents are identified, a byte-by-byte comparison can be done on those data extents to identify actual duplicates, which can then be coalesced. Because the fingerprint of an extent is much smaller than the data extent itself, fingerprints for a very large number of data extents can be stored without consuming a significant portion of the storage capacity in the system.

II. Replication Using Named Data

Name based replication can be used to logically replicate data in a storage system while preserving storage efficiency. Each data extent in the source storage system 3A (hereinafter also called simply "source 3A" or "the source") is assigned a name that is unique within a particular scope. In this context, the name is an identifier (ID) other than an indication of the extent's physical location in storage. A name assigned to a data extent can be, for example, the VVBN of the extent, an object ID (OID), a globally unique ID (GUID), a trusted hash of the extent's contents, etc.

In one embodiment, the source in a replication relationship has two main responsibilities: 1) identifying and sending new data extents, with their names attached, to the destination storage system 3A (hereinafter also called "destination 3B" or simply "the destination") in the replication relationship; and 2) identifying new and modified files and describing the modified contents of files using names. The destination also has two main responsibilities: 1) upon receiving named data extents, inserting/updating entries in its name-to-data-extent map, which is called the "data warehouse" herein; and 2) resolving names using the data warehouse and adding data extents to files as directed by the source.

The approach introduced here allows the source to transmit shared data extents once (along with their names) and refer to those data extents by name, possibly in multiple file contexts. This helps preserve storage efficiency both in transmission from source to destination and in storage at the destination. This model also decouples the transmission of data extents from the actual files that refer to the data extents. The source has considerable freedom in sending the data extents in an order that it finds convenient.

Figure 7:
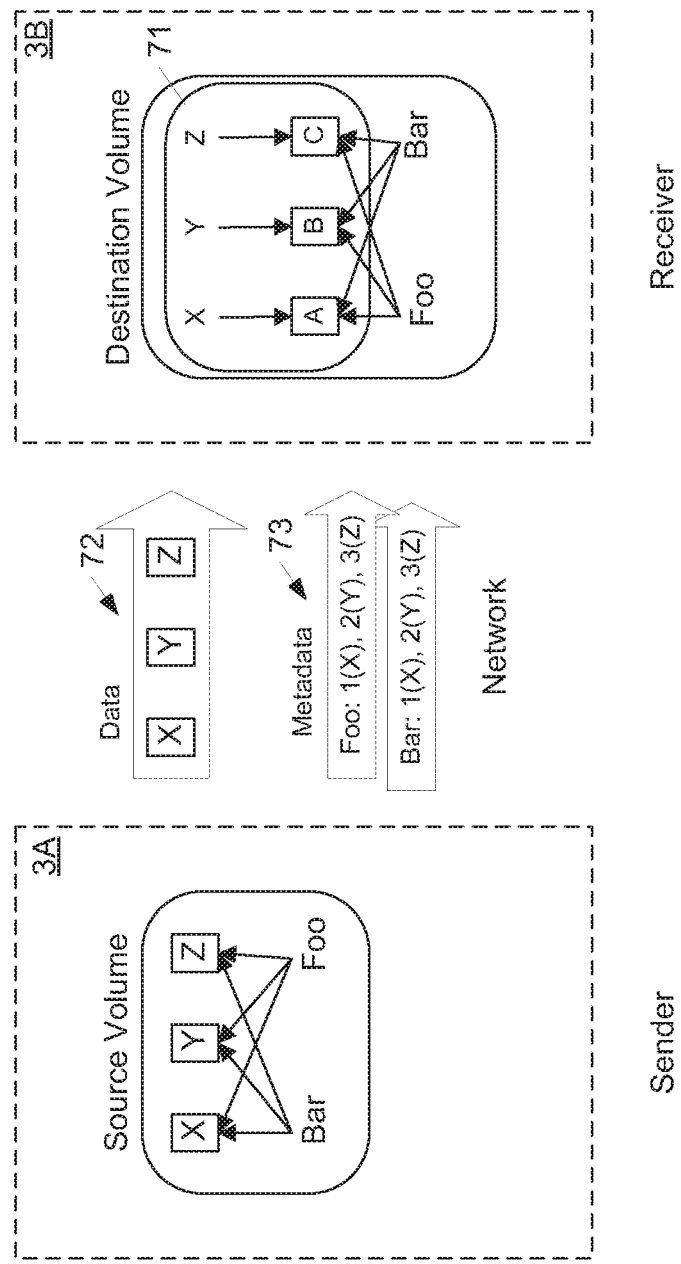
FIG. 7 shows illustrates a technique for performing replication by use of named data.

This technique is explained further now with reference to FIG. 7. In one embodiment, this technique is implemented mostly if not entirely by the replication modules 8A and 8B operating cooperatively in the source storage controller 2A and destination storage controller 2B, respectively. In FIG. 7, two files on a source volume, Foo and Bar, share the same data extents. Assume that the source 3A names the data extents as X, Y and Z. During replication to the destination 3B, the source 3A sends the data with names attached in one stream, the "data stream" 72, and sends file updates referring to the names in a second stream, the "metadata stream" 73. For example, the metadata stream 73 indicates that FBN1 needs to be updated using name X, FBN2 using name Y and FBN3 using name Z. On the destination 3B, the named data extents are inserted into the data warehouse 71 which maps X->local extent A,
Y->B and
Z->C.

When the destination needs to update file Foo, it uses the data warehouse 71 to resolve X, Y, Z to local extents A, B, C and updates Foo by placing extents A, B and C at FBN1, FBN2 and FBN3.

Consider now the properties of the names and the responsibilities of the source and the destination, according to one embodiment.

A. Protocol

1. Properties of Names

Assigning names to data extents allows preserving storage efficiency in transmission during replication as well as in storage at the destination. Names are meant to be short-hand references for the extents. Referring to an extent by its name is an efficient way to describe the entire content of an extent.

In one embodiment, the following rules are applied in naming extents:

Names of extents are unique, such that there are no name collisions. (If hashes are used as names, it is impossible to guarantee that there will be no collisions. However, with certain strong hashes such as SHA-128, the probability of a name collision is considered low enough to be close to zero for practical purposes.)

A name has scope. If, for example, VVBNs are used as names, then the scope of the names is restricted to the source and destination volumes that are in a replication relationship. If an extent moves from one volume to another, its name may get redefined. If self-describing names are used, such as a strong hash of the extent, the names are global in scope and will retain the same name irrespective of the volume in which the data extent resides.

2. Responsibilities of the Source

In one embodiment, the source has the following responsibilities. In general, it has the responsibility of assigning names to data extents, detecting file system changes and describing those changes to the destination using the appropriate names. Toward that end, the source does the following:

ensures that all assigned names are unique (no name collisions).

if names are reused or redefined, the source, before reusing a name, detects when names are no longer in use and informs the destination about names that are no longer in use.

assigns names to data extents.

identifies all shared uses of a data extent by the same name.

detects each modified data extent and transmits it once with name attached.

detects file changes and describes the changes using names.

The source may also describe file changes using unnamed data extents;

for example, the source may choose not to name certain data extents such as those describing a directory, etc.

3. Responsibilities of the Destination

In general, the destination maintains a valid name-to-data map (the data warehouse) and applies file system changes as instructed by the source. To maintain the data warehouse, the destination does the following:

upon receiving new named data extents from the source, creates the name to data extent mapping in the data warehouse.

maintains only valid mappings from names to local data extents (not having a name-to-data mapping is considered valid). The name-to-data mapping acquires a reference on the data extent. It is valid for a data extent to be referenced only by the map when instructed by the source to remove a name, removes the name-to-data mapping from the data warehouse.

In some embodiments, the destination may also drop names from its data warehouse even if the names are still in use by the source. This can result in a potential loss of storage efficiency but will not impact the ability of the destination to satisfy client reads.

To apply file system changes, the destination does the following:

upon receiving file changes described using names (references), replaces names (references) with data extents, consulting the data warehouse as directed by the source. While replacing references, it resolve names with a shared copy of the data extent rather than by copying. It also tolerates references to names arriving before the named data extents.

if the name-to-data mapping does not exist, the destination pulls the missing data from the source.

B. Example: VVBNs as Extent Names

An example will now be described of an implementation of name based replication using VVBNs as names for data extents. It will be recognized, however, that other types of names could be used instead, as discussed above. The following terminology shall be used in the following description:

Snapshot: A point-in-time copy of a data set, such as a file system.

Snapmap: An active bit map, created and maintained by the storage manager, which is captured in a snapshot and which indicates extent usage (free versus used) in the particular snapshot.

Kireeti bits: A set of bits, created and maintained by the storage manager for every data extent, which indicates the extent's type, level (e.g., L0, L1), etc.

VVBN (Virtual Volume Extent Number): A unique Identifier for a data extent inside a volume.

Base Snapshot: A snapshot held in common between the source and the destination.

Incremental Snapshot: A snapshot that is currently being transferred from source to destination as part of a replication operation.

The example implementation presented here utilizes source volume VVBNs as extent names. In one embodiment, VVBNs as extent names have the following properties:

they are readily available—every extent allocated in the file system gets a VVBN, according to one embodiment.

within each volume, the storage manager 31 guarantees that each VVBN uniquely identifies data extent contents.

they are not global in scope. When data extents are replicated to other volumes they can be assigned different VVBNs.

they can be re-used. Consequently, the source will detect and inform the destination when a VVBN is no longer in use (a method for doing so is described below).

Using VVBNs as names also can yield performance benefits. Unlike hashes, for example, VVBNs are compact identifiers (e.g., 64 bits each in one embodiment). Also, compared to hashes, some locality can be expected with VVBNs, as opposed to hashes which are non-local. Further, VVBNs can permit faster in-storage indexing and lookups than hashes.

1. Source

To generate data changes (the data stream), the source compares the snapmaps of the base and incremental snapshots and, where they differ, consults the Kireeti bits to identify any freed or newly allocated user extents (i.e., L0 extents of regular files or streams). For each freed extent, the source then transmits a message to the destination to indicate that the name is no longer in use. For each newly allocated extent, the data contents of the extent are sent to the destination along with the extent's name, which in this example is its VVBN.

To generate the metadata stream, the source compares the inode files of the base and incremental snapshots to detect new/modified files. For each new/modified file, the source compares the buffer trees of the files to detect new/modified extents. For each modified extent, the source transmits one or more messages to the destination indicating how to update file regions using the source VVBN as the name.

Sending named data extents independent of the file(s) to which they belong has benefits. Example, it enables the source to read modified data extents in a manner that is disk-friendly. Certain file systems tend to optimize data writes, such that random writes in file space get aggregated into contiguous writes in the VVBN space. Consequently, reading data extents in VVBN order can provide improved performance in terms of both CPU and storage device utilization at the source. As another example, after identifying all changed VVBNs, they can be matched to their corresponding PVBNs, and reads can then be issued in PVBN order (e.g., disk order). If the goal is to reduce total transfer time from source to destination, the data and metadata streams are preferably transmitted in parallel. Transmitting them serially adds to the total transfer time. The trade-off is that transmitting streams in parallel reduces overall transfer time at the expense of greater CPU utilization and possibly greater storage I/O utilization.

2. Destination

To support storage efficient replication, the destination storage system maintains a name-to-data map, called a "data warehouse." In one embodiment the data warehouse maps from the source's names (e.g., source VVBNs) to the destination's own local data extents (e.g., destination VVBNs). One possible implementation of the data warehouse can be similar to that of the container file discussed above in reference to FIG. 4, which maps VVBNs to PVBNs. For example, the source's VVBNs can be the FBNs into the map, where the L1 extents contain pointers to local VVBNs. This provides both mapping of source names to destination data extents and unambiguously identifies data extents by acquiring references to them.

In one embodiment, upon receiving named data in the data stream, the destination writes each data extent into its data warehouse at an FBN equal to the source VVBN. This creates a source name to destination data extent mapping and also acquires a reference on the local data extent from the data warehouse. Upon receiving instructions to free names, the destination removes from the data warehouse the map entry (by punching a hole) that has the indicated source VVBN as the FBN. This action releases the reference on the local data extent from the map.

The destination follows instructions received from the source in the metadata stream regarding how to update each file. When the destination receives file updates using names, the destination performs a lookup into the data warehouse using the source VVBN as the key (FBN), to obtain the corresponding local extent (destination VVBN). The lookup produces an extent address that can be inserted into the inode through extent sharing.

C. Replication Process Flows

Figure 8:
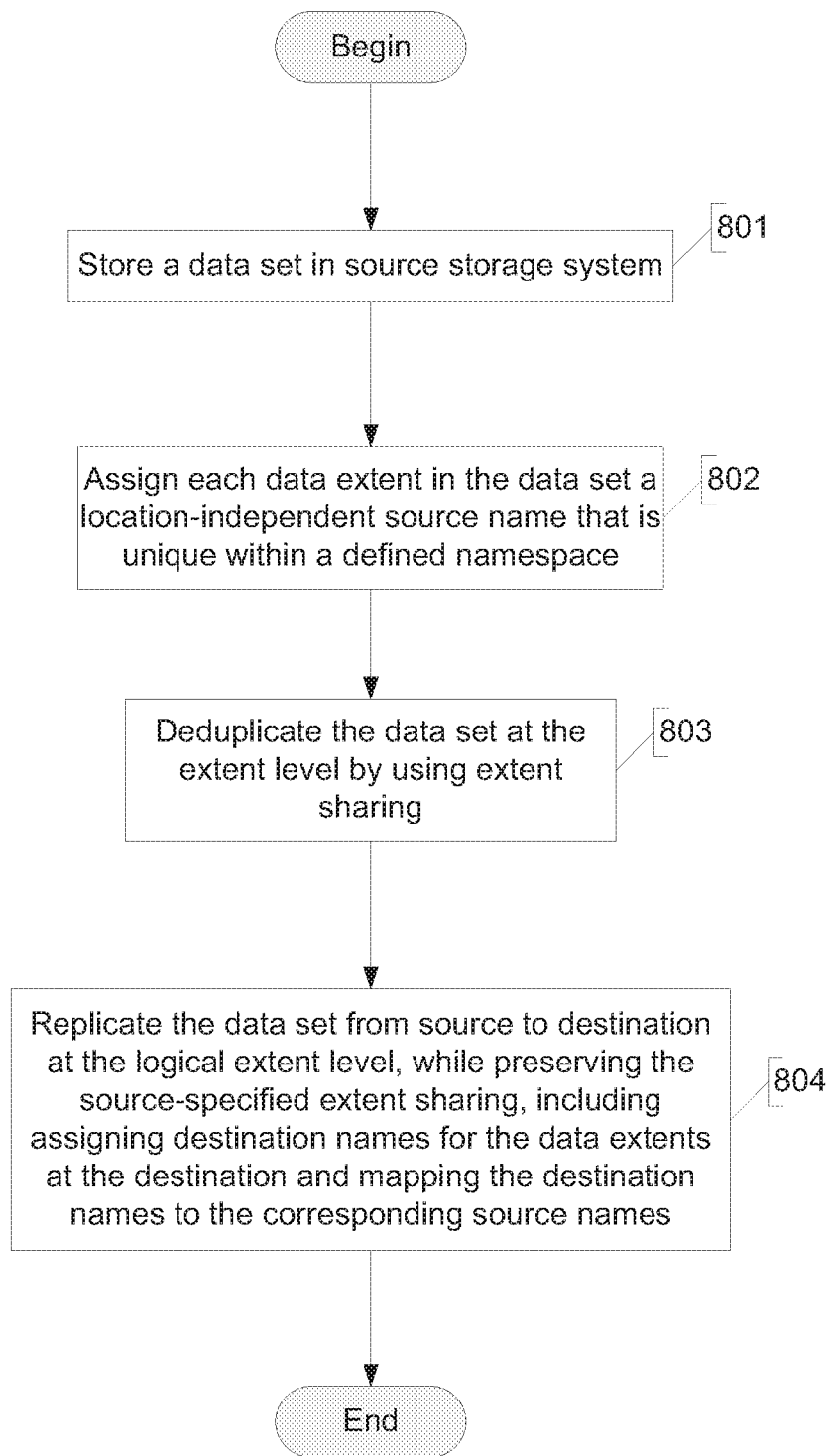
FIG. 8 is a flow diagram illustrating an example of an overall process flow for named data replication.

FIG. 8 illustrates an example of the overall process flow for named data replication. At step 801 the source stores a data set (e.g., a volume, LUN, file) locally in its storage subsystem 4A. At step 802 the source assigns each data extent in the data set a location-independent source name that is unique within a defined namespace. At step 803 the source deduplicates the data set at the extent level, by using extent sharing in the manner described above. At step 804 the source and the destination cooperate to replicate the data set from the source to the destination at the logical extent level. In step (sub-process) 804, any source-specified extent sharing is preserved, destination names for the data extents are assigned by the destination, and the destination names are mapped to the corresponding source names by the destination.

Replication of a snapshot according to one embodiment involves initially a baseline transfer and, subsequently, one or more incremental transfers.

1. Baseline Transfer

Figure 9:
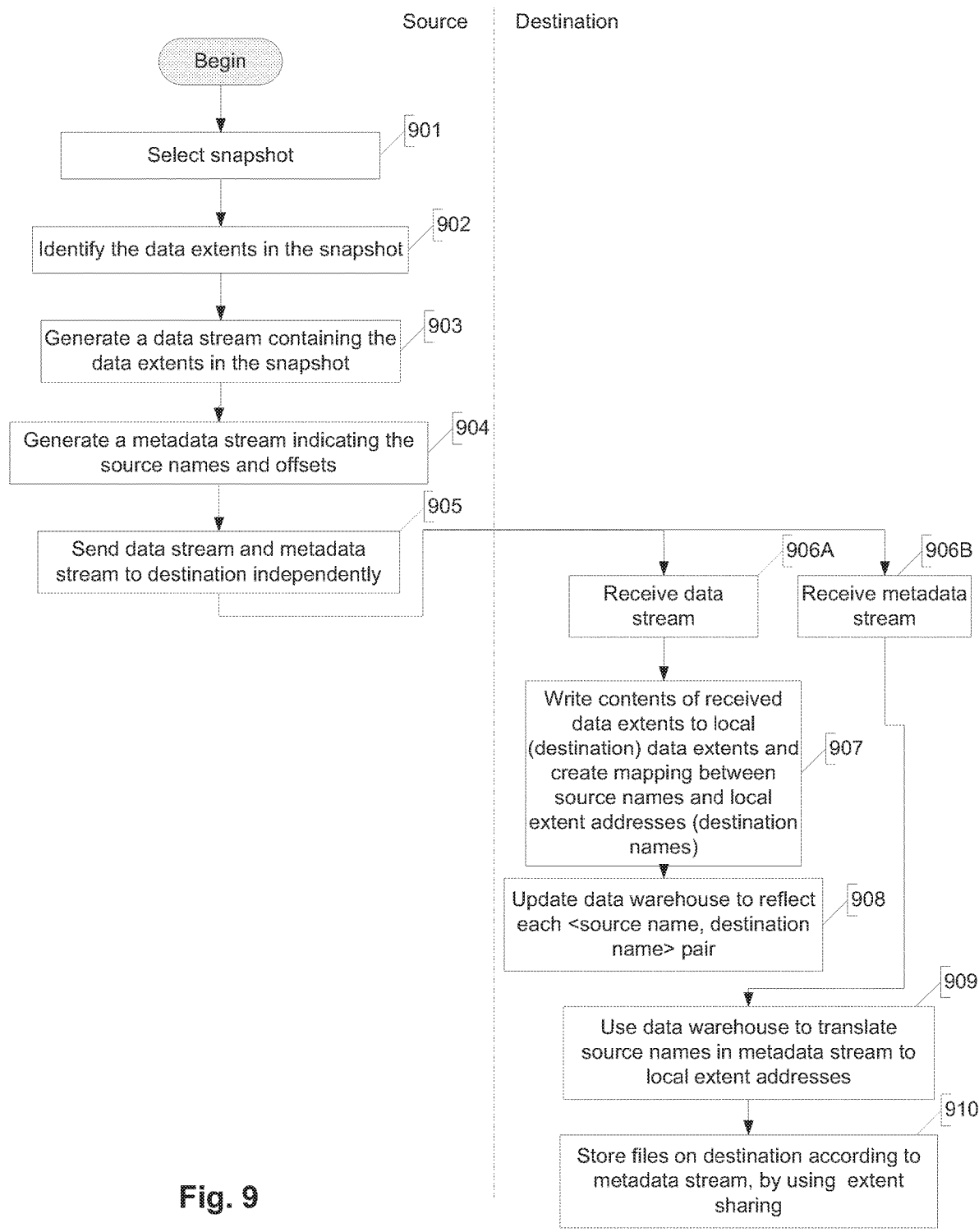
FIG. 9 is a flow diagram illustrating an example of a process flow for performing transfer of a baseline snapshot during named data replication.

FIG. 9 illustrates an example of a process flow for performing a baseline transfer during the replication step 804. Initially, at step 901 the source selects a baseline snapshot. The source then identifies all of the data extents in the snapshot at step 902. At step 903 the source generates a data stream containing the data extents in a snapshot. At step 904 the source generates a metadata stream indicating the source names and offsets within a file or inode for all of the files in the snapshot. The source then sends the data stream and the metadata stream independently to the destination at step 905. These two streams can be sent in parallel (i.e., concurrently) or sequentially.

The destination receives the data stream at step 906A, and in response, executes steps 907 and 908. At step 907 the destination writes the contents of the received data extents (from the data stream) to data extents in its local storage subsystem 4B and creates a mapping (in the data warehouse) between the source names and local extent addresses (destination names) of the local data extents. Next, at step 908 the destination updates the data warehouse by adding each <source name, destination name>pair.

The destination receives the metadata stream at step 906B, and in response, executes steps 909 and 910. Note that steps 906B, 909 and 910 can occur asynchronously (e.g., concurrently) with steps 906A, 907 and 908. At step 909 the destination uses the mappings in the data warehouse to translate the source names in the metadata stream to local extent addresses. At step 910 the destination then stores files in its local storage subsystem 4B according to the metadata stream, by using extent (extent) sharing.

An example of how this baseline process can be applied will now be described. During a baseline transfer a user-selected snapshot is designated as the base snapshot and the entire contents of the base snapshot are replicated. Let the base snapshot be called "snap_1" in this example. Assume that snap_1 at the source includes two files, Foo and Bar. Assume further that:

Foo has VVBNs sv1, sv2, and sv3 at offsets, 0, 4k and 8k, respectively.

Bar has VVBNs sv1, sv2, and sv3 at offsets 0, 4k and 8k, respectively.

In the data stream, the source reads the new extents sv1, sv2 and sv3 and transmits their data contents along with their VVBNs (sv1, sv2, sv3) as names. In the metadata stream the source describes changes to files using names and transmits:

Foo: sv1@0, sv2@4k, sv3@8k and

Bar: sv1@0, sv2@4k, sv3@8k.

Upon receiving named data extents, the destination writes the contents into local data extents and creates a mapping between the source names and local extent address, such as:

sv1->rv1
sv2->rv2
sv3->rv3

Upon receiving file updates for Foo and Bar in the metadata stream, the destination translates source names to corresponding local extent addresses and updates its local files, applying extent sharing. After the transfer is done, on the destination the relevant portion of the file system would look like this:

Foo has VVBNs rv1, rv2, rv3 at offsets, 0, 4k and 8k, respectively.

Bar has VVBNs rv1, rv2, rv3 at offsets 0, 4k and 8k, respectively.

All of the changes on the destination are captured in a snapshot, tagged as snap_1. Snap_1 contains the same data on both the source and the destination as far as the user is concerned. Snap_1 is referred to as the "common" snapshot between the source and the destination.

2. Incremental Transfer

Figure 10:
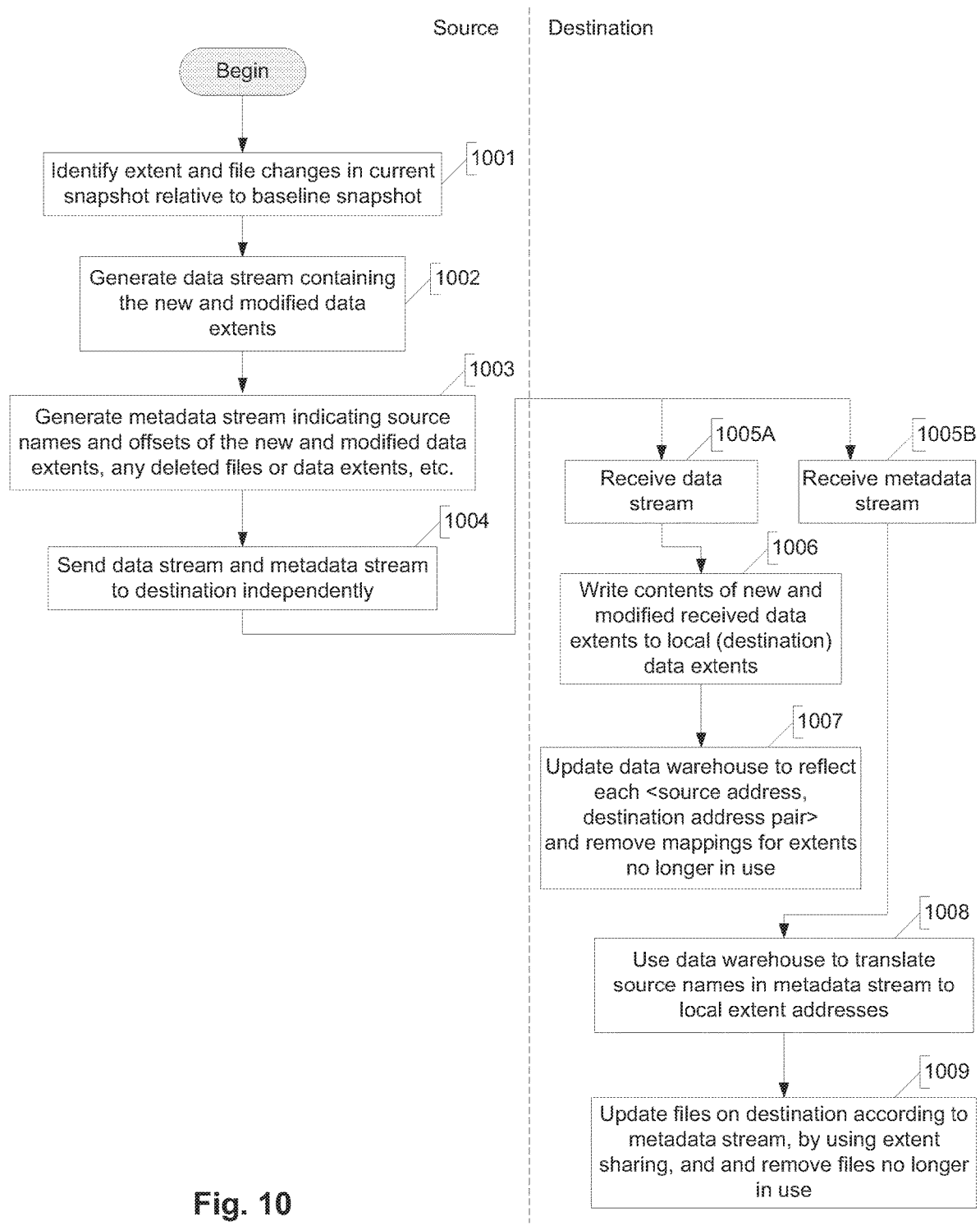
FIG. 10 is a flow diagram illustrating an example of a process flow for performing incremental transfer during named data replication.

During the incremental transfer the differences between the common snapshot and a user-selected incremental snapshot are replicated. FIG. 10 illustrates an example of a process for performing an incremental transfer. Initially, at step 1001 the source identifies extent and file changes in the current snapshot relative to the baseline snapshot. The specific manner in which the changes are identified is not germane to this description; various techniques are known in the art for identifying differences between two data sets. At step 1002 the source generates a data stream containing the new and modified data extents in the current snapshot (relative to the baseline snapshot). At step 1003 the source generates a metadata stream indicating the source names and offsets of the new and modified data extents. The source then sends the data stream and the metadata stream independently to the destination at step 1004. These two streams can be sent in parallel (i.e., concurrently) or sequentially.

The destination receives the data stream at step 1005A, and in response, executes steps 1006 and 1007. At step 1006 the destination writes the contents of the received new and modified data extents (from the data stream) to data extents in its local storage subsystem 4B. Next, at step 1007 the destination updates its data warehouse to reflect each <source address, destination address> pair and also removes any mappings of extents that are no longer in use.

The destination receives the metadata stream at step 1005B, and in response, executes steps 1008 and 1009. Note that steps 1005B, 1008 and 1009 can occur asynchronously (e.g., concurrently) with steps 1005A, 1006 and 1008. At step 1008 the destination uses the data warehouse to translate the source names in the metadata stream to local extent addresses. At step 910 the destination then stores files in its local storage subsystem 4B according to the metadata stream, applying extent (extent) sharing.

An example of how this incremental process can be applied will now be described. Let the incremental snapshot be called "snap_2." Assume snap_2 includes files Bar and Fubar as follows:

Bar has VVBNs sv1, sv2, and sv100 at offsets 0, 4k, 8k, respectively.

Fubar has VVBNs sv1, sv111, and sv112 at offsets 0, 4k, 8k, respectively

Foo has been deleted.

In the data stream, the source compares the snapmaps in the base and incremental snapshots (snap_1 and snap_2), reads the new extents sv100, sv111 and sv112, and transmits their data contents along with their names. The source also indicates that sv1 and sv3 are no longer in use, since they appear in snap_1 but do not appear in snap_2.

In the metadata stream the source describes changes to the files using names and therefore transmits:

Bar: sv100@8k

Fubar: sv1@0, sv111@4k, sv112@8k and indicates that Foo has been deleted.

Upon receiving named data extents, the destination updates the existing data warehouse with new entries and removes mappings that are no longer in use. The resulting mappings are:

sv1->rv1 sv2->rv2

[sv3->rv3] (deleted)

sv100->rv100 sv111->rv211 sv212->rv213 where:

underlined text represents new mappings in the data warehouse;

text within brackets ("[ ]") indicates deleted mappings; and normal text indicates unchanged mappings.

Upon receiving file updates in the metadata stream, the destination translates source names to local extent address and updates files using extent sharing. It also removes Foo from the file system. The result is:

Bar has VVBNs rv1, rv2, and rv100 at offsets 0, 4k, 8k, respectively

Fubar has VVBNs rv1, rv211, and rv212 at offsets 0, 4k, 8k, respectively

The incremental changes are captured in the snapshot tagged as snap_2. Now there are two common snapshots between the source and the destination, snap_1 and snap_2.

Note that naming data to preserve storage efficiency has applications beyond logical replication. The technique can be extended to work in a variety of applications, such as: 1) to achieve network bandwidth savings in inter-cluster communication in a storage cluster; 2) in on-demand data mobility operations, to preserve storage efficiency while moving data (some such applications migrate data on-demand and restore data on-demand, etc.); and 3) in caching environments, to preserve space efficiency between a cache and storage controller or appliance.

III. Extent Size Asymmetry

For various reasons it might be desirable to accommodate differences in size between data extents used at the source and data extents used at the destination; such differences are referred to as extent size asymmetry.

Extent size asymmetry between the source and destination can arise due to various reasons. For example, the source and destination can be running different types or versions of storage operating systems which employ different extent sizes. This can be either a transient situation or a permanent one, depending on the use case. As another example, in backup and vaulting scenarios it may be desirable to provide additional storage savings on the destination volumes. For example, compression may not be suitable for certain workloads on the source but might be perfectly suitable on the destination. It further may be desirable to preserve the extent sharing present on the source during replication both during transmission and in storage at the destination. At the same time it may be desirable to compress the data on the destination without losing any storage efficiency. Hence, extent size asymmetry can occur because compression algorithms might want to use an extent size different than that on the source to achieve optimal results.

In each of these cases, it is desirable for the source to send named data once and send file system updates referring to data extent names.

Depending on the extent sizes of the source and the destination, there are two possible scenarios when extent size asymmetry exists: 1) the source's extent size is larger than the destination's extent size, or 2) the source's extent size is smaller than the destination's extent size. In either scenario, the responsibility of the source is unchanged. As described above the source has two responsibilities: 1) to detect new/changed data extents and send them to the destination with names attached, and 2) to detect new/changed portions of files and send updates referring to the data extent names. The source does not need to have knowledge of the extent sizes used at the destination. All of the features and functions to handle extent size asymmetry can be implemented on the destination.

The main functions of the destination are to update the data warehouse and apply file system changes. The following discussion examines the two above mentioned scenarios and how they can be handled. For the following discussion it is assumed, only for purposes of facilitating description, that extent sizes are a multiple of 4 Kbytes (4k). The same approach can be used, however, for any arbitrary size of data extent.

A. Source Extent Size Larger Than Destination Extent Size

Figure 11A:
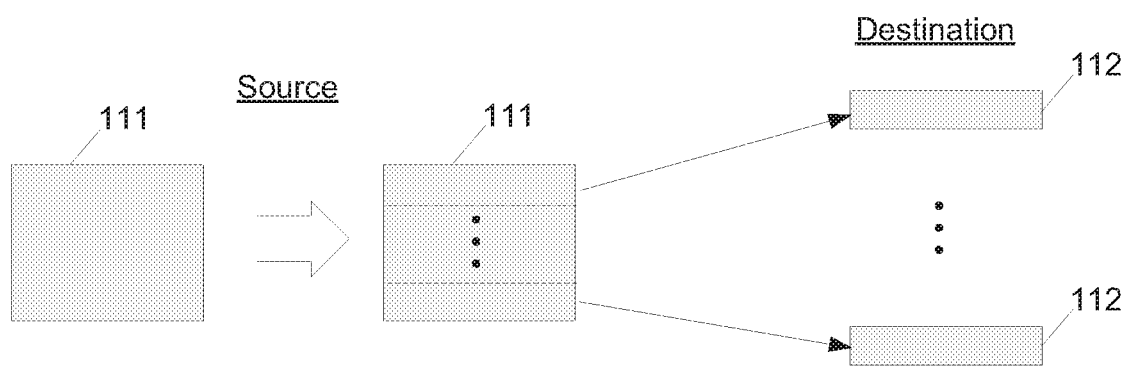
FIGS. 11A and 11B illustrate two different scenarios of extent size asymmetry.

If the source's extent size is larger than the extent size of the destination, a named data extent from the source cannot be represented in a single extent in the destination; multiple destination extents are required to store it. This scenario is illustrated in FIG. 11A, which shows a source data extent 111 being mapped to a corresponding plurality of destination data extents 112.

Consider an example in which the source is using a 12k extent size and the destination is using a 4k extent size. In snap_1 the source has two files, Foo and Bar, where Foo has VVBN sv1 at offset 0 (length 12k)

Bar has VVBN sv1 at offset 0 (length 12k)

The source transmits data extent sv1 which is 12k in size and describes file contents in the metadata stream using names, as follows:

Foo: sv1@0, length=12k

The destination writes the contents of the named data into local extents and creates a mapping between the source names and the local extent addresses, such as:

Sv1->[rv1, rv2, rv3]

The destination needs a set of three extents to hold the 12k of data from the source in this example. The set is ordered and is treated as a single unit. The extents in the set are allocated, shared and freed as a unit. Upon receiving file updates for Foo and Bar, the destination uses the data warehouse to lookup name sv1 and resolve it into an extent set and then shares the extent set into the files Foo and Bar to update the file system, the result of which can appear as follows:

Foo has VVBNs rv1, rv2, rv3 at offsets, 0, 4k and 8k (length 12k), respectively

Bar has VVBNs rv1, rv2, rv3 at offsets, 0, 4k and 8k (length 12k), respectively

In certain embodiments, for each mapping of source extent to destination extent the data warehouse maintains a reference count for the data extent, indicating the number of files that include (reference) the extent on the destination. So, continuing the example above, in a subsequent transfer, freeing the name sv1 will cause removal of the mapping for sv1 from the data warehouse mapping, i.e., will cause the reference counts on all three VVBNs rv1, rv2 and rv3 to be decremented by one.

B. Source Extent Size Smaller Than Destination Extent Size

Figure 11B:
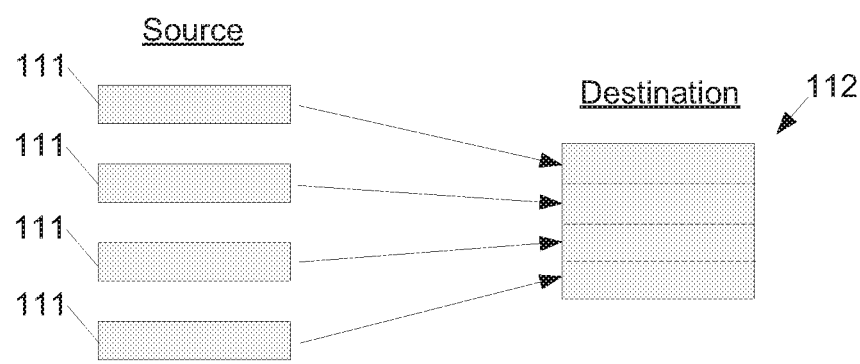

If the source has an extent size that is smaller than the extent size of the destination, the data referred to by a source extent name is implemented as part of a larger extent on the destination, where such part can be called a "sub-extent." This scenario is illustrated in FIG. 11B, where a plurality of source data extents 111 are mapped to different parts of a single destination data extent. Consequently, a technique is needed to refer to and manage parts of extents on the destination. The following discussion details such a technique.

In one embodiment, instead of referring to data simply by its extent or extent number, a tuple is created containing <DataExtent Identifier, DataExtent Part number>. For the current discussion it is assumed that each data extent part (sub-extent) is of a fixed size. For example, an extent of size 64k with each part having a fixed size of 4k can be represented as de1 and its parts 0 thru 15 or simply, de1.0, de1.1, de1.15.

The data extent identifiers are indices into a data extent container. In one embodiment the data extent container provides the following facilities:
- mapping of the data extent identifier to a set of ordered extent addresses (e.g., VVBNs and/or PVBNs) (it holds a reference on each of the extents that make up the data extent).
- a reference counting mechanism on the individual parts of the data extents, which allows individual parts of the extents to be de-allocated.

An example of how the above-mentioned approach can be applied will now be described. First, assume that the contents of the data warehouse are as follows:

| Source-name | -> | {data extent ID, data extent-part} |
|---|---|---|
| S1 | -> | {DE1, 0} |
| S2 | -> | {DE1, 1} |

The contents of a data extent container can be represented as follows:

```
Data extent id -> {
        {num-parts}
        {Extent Address: VVBN1/PVBN1,...,VVBNn/PVBNn}
        {ref-cnt[num-parts]}
    }
``` or as a specific example:

```
DE1     -> {
                {2}
                {rv1, rv2}
                {1, 1}
            }
```

In this example, num-parts is the number of parts in the data extent, and ref-cnt is the reference count (number of references) to each part of the data extent. The source names S1 and S2 are combined into extent DE1. S1 is represented by the first part of DE1, and S2 is represented by the second part of DE1. Each part of the extent has a reference count of 1, since the data warehouse refers to each of the part.

In general, a larger data extent is formed by an ordered collection of parts or data extents (represented by extent addresses VVBNs and/or PVBNs). To form a data extent, first, an unused data extent identifier is allocated. Then, a set of extents (e.g., VVBNs/PVBNs) is allocated to hold the data. The data extent is then inserted into the data extent container, with the extent ID as the index. Inserting into the extent map takes a reference on all of the VVBNs (and PVBNs) that make up the extent. Additional references to parts of the extent results in incrementing the reference count on the corresponding parts. Deletion of files results in decrementing the reference counts of the corresponding parts. For lookups, the extent identifier (ID) and the uncompressed offset are used to lookup into the extent to load the data extent from the extent map and fetch the desired part (note that the length of each part is assumed to be of some fixed length).

Consider further the previous example. In snap_1 the source has two files, Foo and Bar, as follows:
Foo has VVBN sv1, sv2, sv3 at offsets 0, 4k, 8k, respectively
Bar has VVBN sv1, sv2, sv3 at offsets 0, 4k, 8k, respectively.

The source transmits data extent sv1, sv2, sv3 which are each 4Kbytes (4K) in size and describes file contents using names as follows:
Foo: sv1@0, sv2@4k, sv3@8k and
Bar: sv1@0, sv2@4k, sv3@8k.

Assume that the destination has an extent size of 16k. In that case, the data warehouse, the data extent container map and the user files Foo and Bar will appear as follows:

Data Warehouse:

| sv1 | -> | DE1.0 |
|---|---|---|
| sv2 | -> | DE1.1 |
| sv3 | -> | DE1.2 |

Data Extent container (before file system update):
DE1->{{4}, {rv1, rv2, rv3}, {1, 1, 1, 0}}
File system:
Foo has DE1.0, DE1.1, DE1.2 at offsets, 0, 4k and 8k, respectively.
Bar has DE1.0, DE1.1, DE1.2 at offsets 0, 4k and 8k, respectively.
Data Extent container (after file system update):
DE1->{{4}, {rv1, rv2, rv3}, {3, 3, 3, 0}}
It can be seen that the reference counts of the extent parts have increased to 3, since for each part there is one reference from the data warehouse and two references from the files Foo and Bar.

Now assume that the source file Bar has been deleted and the third logical extent of Foo was replaced with other data. The result of the entire set of changes would appear as follows (where text in brackets represents deletion and underlined text represents addition):

Data Warehouse:

| sv1 | -> | DE1.0 |
|---|---|---|
| sv2 | -> | DE1.1 |
| [sv3 | -> | DE1.2] (deleted) |
| sv4 | -> | DE9.0 |

File system:
Foo has DE1.0, DE1.1, DE9.0 at offsets, 0, 4k and 8k, respectively.

[Bar has DE1.0, DE1.1, DE1.2 at offsets 0, 4k and 8k, respectively.]
(deleted)
Data Extent container (after file system update):

| DE1 | -> | {{4}, {rv1, rv2, rv3}, {2, 2, 0, 0} } |
| DE9 | -> | {{4}, {rv4}, {2, 0, 0, 0} } |

Note that the reference count for part DE1.2 has decreased to zero, since that part is no longer being used. Note also that although data extent DE1 has only two parts that are currently being used, it is still holding onto three extents, rv1, rv2, rv3, thereby potentially causing space inflation. The following section explains how the extents inside a data extent can be rearranged to reclaim such unused space.

C. Data Extent Rearrangement

An advantage of the above-described solution is that the ordered set of extents that make up a data extent on the destination can be rearranged without modifying the extent ID. In the above example, DE1.2 is unused but tying up space. At this point the destination can reorganize the extents of the data extent. In the above simple case, we a direct association exists between extent parts and the VVBNs. For example, part0 is represented by rv1, part1 is represented by rv2 and part2 is represented by rv3. The destination can simply de-allocate rv3 and reclaim its space, represented as follows:

DE1->{{4}, {rv1, rv2}, {2, 2, 0, 0}}

D. Compression of Data Extents

The ability to track the number of references to each part of an extent and reorganize data extents also provides the flexibility to choose the data format on the destination, such as whether to store the data uncompressed or compressed. Continuing with the above example, after the first backup the data extent container map appeared as follows:

DE1->{{4}, {rv1, rv2, rv3}, {3, 3, 3, 0}}

Assume now that the data is compressible and that the destination reads rv1, rv2, rv3 and compresses them down into, for example, two extents, crv1 and crv2. The destination can now update the data extent container map as follows:

DE1->{{4}, {crv1, crv2}, {3, 3, 3, 0}}

No other changes are needed in the file system. The data warehouse and the user files Foo and Bar all remain the same, i.e., they do not need to know whether the underlying data extent DE1 holds data compressed or uncompressed. Note that there are still three active parts of the extent DE1 but only two extents holding the data for the three parts.

Now assume that in future updates, all of the parts of DE1 except the first part get unused, leading to the following:

DE1->{{4}, {crv1, crv2}, {3, 0, 0, 0}}

Now the destination is holding onto two extents even though only one extent part is being used, thereby causing space inflation. To overcome this effect, the destination can reorganize the data extent again by reading the compressed data, eliminating any unused parts and rewriting it either as compressed or uncompressed. In this particular case it is better to write the data back as uncompressed, leading to the following:

DE1->{{4}, {rv17}, {3, 0, 0, 0}}

Hence, the techniques of addressing data extents with parts and referencing the parts individually provide the flexibility to handle larger extent sizes on the destination.

IV. Handling Namespace Changes

A replication relationship can undergo configuration changes during its life cycle, and such changes can affect the data naming scheme being used, which may necessitate rebuilding the name-to-data mapping (in the data warehouse) on the destination. That is, in the absence of a data warehouse rebuild, the next replication updates have potential to lose storage efficiency. Such a rebuild allows preserving existing space savings while also permitting future space savings.

Some of the most common functions that result in a configuration change of a replication relationship are changing or moving the source volume, promoting a volume replica to be the new source, flip/reverse resynchronization, and cascade reorganization. These functions are discussed further below. If the scope of the extent names is global, such as when a strong hash is used, then performing any of the replication functions mentioned above has no impact on the name-to-data mapping on the destination. In other words, there is no need to rebuild the mapping. On the other hand, if the scope of the names is local, such as when VVBNs are used as names, then performing any of the above-mentioned functions will likely impact the name-to-data mapping on the destination and will therefore necessitate rebuilding the map (if storage efficiency is to be preserved).

The source of a replication relationship can change because of a volume move. If the new source has redefined the names of all of the data extents, then the name to data mapping on the destination is no longer valid. Consequently, in one embodiment, before the start of the next transfer update from the new source, the name-to-data mapping is rebuilt on the destination.

Flip resynchronization is the reversal of the direction of the replication relationship, i.e., swapping source and destination functions. This function amounts to a change of source and therefore also necessitates rebuilding the name-to-data mapping.

A cascade relationship involves a replication chain, where at least one destination acts as the source for a volume downstream. For example, consider the cascade chain A->B->C, where A, B, C are all storage systems involved in a replication relationship. B maintains a name-to-data mapping for A's names, and C maintains a name-to-data mapping for B's names. If a failure associated with B occurs such that A needs to replicate directly to C, this amounts to a change of source and therefore necessitates rebuilding the name-to-data mapping on C.

When VVBNs are used as names, the above-mentioned operations can result in a source redefining all of its names for a given volume. During the next update after a configuration change, the source and the destination therefore co-ordinate to detect that the namespace has changed and then rebuild the data warehouse on the destination.

Figure 12:
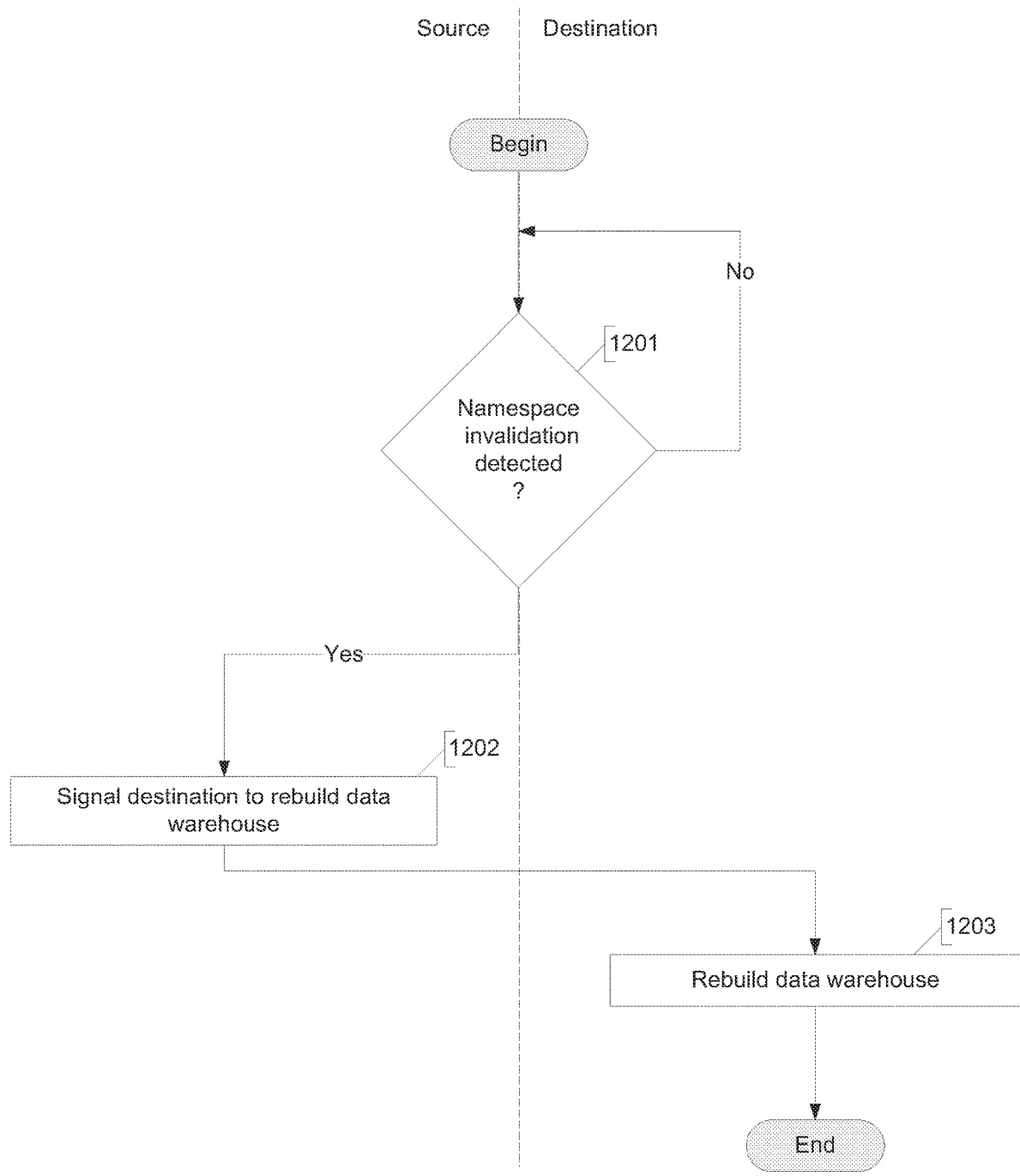
FIG. 12 is a flow diagram illustrating an example of a process flow for handling configuration changes that may affect the data extent namespace.

FIG. 12 illustrates an example of a process for handling configuration changes that can affect a data extent namespace. This process is implemented cooperatively by both the source and the destination (collectively "the replication system"). At step 1201 either the source or destination performs a check to detect whether the data extent namespace is no longer valid, i.e., has changed. This check can be done periodically, for example, or at specified times, or in response to one or more defined events (a volume move, flip resynch, storage controller failure, etc.).

For each incremental snapshot transfer, the destination tags its name mapping in the data warehouse with an identifier assigned from the source. For example, the identifier could be the physical unique user identifier (UUID) of the snapshot being transferred. Replacing the snapshot with a logically equivalent version changes the identifier of the snapshot. This enables detecting a change in name space, by detecting when the identifier changes.

If and when invalidation (change) of the data extent namespace is detected, the source signals the destination at step 1202 to rebuild the relevant name-to-data mapping, which the destination then does at step 1203. A technique to rebuild the mapping is described below.

Once a change in the namespace is detected, the system can choose one of three options for rebuilding the mapping: 1) rebuild a complete map (complete data warehouse) before the next update, 2) rebuild a partial map, or 3) rebuild the map in the background.

The first option is to rebuild a complete map before the next update. A replica should contain the same set of files as the original. The source, by describing all the files in its volume by name, allows the destination to completely rebuild the data warehouse.

The second option is to rebuild a partial map. When a source changes its namespace, the destination can discard its data warehouse. Future updates from the new source will generate new map entries but there will be no map entries for the older data extents already present (at the destination). In this case the map is partial since it contains name to data extent mappings for only a subset of the data extents present on the source. All of the existing sharing (before the source namespace change) on the destination is preserved, and all new sharing (after the source namespace change) will also be preserved. However, any sharing of new data with data existing before the source change will not be preserved during replication.

The third option is to rebuild the map in the background. There may be cases where the next update (after a source namespace change) cannot wait until the complete map is rebuilt. In such scenarios the transfer can still happen while the map is being built in the background. This could result in potential loss of space savings until the complete map is built but must not affect completion of the transfer.

Figure 13:
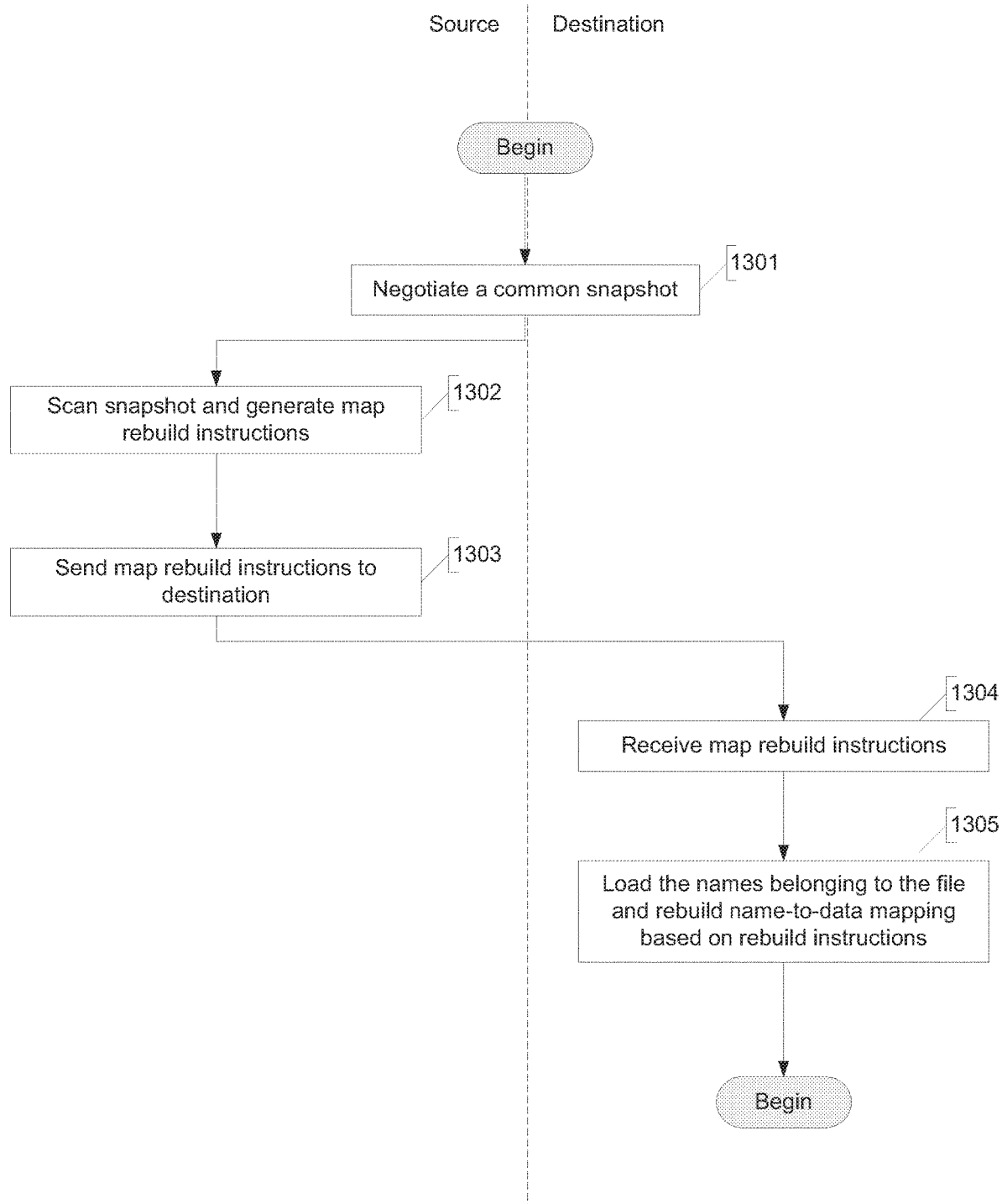
FIG. 13 is a flow diagram illustrating an example of a process flow for rebuilding a name-to-data map on the destination in response to a change in the data extent namespace.

FIG. 13 illustrates a process for rebuilding a name-to-data mapping on the destination in response to a change in the data extent namespace. Initially, at step 1301 the source and destination negotiate a common snapshot upon which to base the rebuild. The source then scans the snapshot to generate map rebuild instructions at step 302. At step 303 the source sends the map rebuild instructions to the destination, which the destination receives at step 1304. In response to the instructions, at step 1305 the destination loads the names belonging to the file and rebuilds the mapping based on the received rebuild instructions.

An example of how this rebuild process can be applied will now be described. Assume that in common snapshot snap_1 the source has two files, Foo and Bar, comprising the following data extents:

Foo has VVBN sv1, sv2, sv3 at offset 0, 4k, 8k, respectively

Bar has VVBN sv1, sv2, sv4 at offsets 0, 4k, 8k, respectively.

Assume further that either the source or destination has changed in a way that the namespace is no longer valid. Using the mechanism described above, the source detects that the name-to-data mapping is no longer valid and decides to initiate a name-to-data map rebuild before the next replication update. Accordingly, the source first scans the files Foo and Bar in the common snapshot snap_1 and transmits rebuild instruction for names sv1, sv2, sv3 by describing the files as:

Foo: sv1@0, sv2@4k, sv3@8k and

Bar: sv1@0, sv2@4k, sv4@8k.

The destination receives the rebuild instructions for files Foo and Bar and loads its local names for files foo and bar in the order specified by the rebuild instruction. For example, the destination's view of files Foo and Bar in snap_1 may appear as:

Foo: dv1@0, dv2@4k, dv3@8k and

Bar: dv1@0, dv2@4k, dv4@8k.

Accordingly, the destination will rebuild the name-to-data mapping to appear as follows.

| sv1 | -> | dv1 |
| sv2 | -> | dv2 |
| sv3 | -> | dv3 |
| sv4 | -> | dv4 |

Once the name-to-data mapping is rebuilt, the next replication update will occur as usual.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving, by a first file system from a second file system, a first extent and a second extent, the first extent having a first size used by the second file system to store extents;
storing the first extent and the second extent into a single destination extent having a second size, larger than the first size, and used by the first file system to store destination extents;
maintaining a mapping to map:
a first source name of the first extent to a first tuple comprising a first extent identifier and a first extent part of the single destination extent used to store the first extent, wherein the first extent identifier specifies a first count and extent addresses of extent parts of the single destination extent; and
a second source name of the second extent to a second tuple comprising the first extent identifier and a second extent part of the single destination extent used to store the second extent; and
in response to a lookup for the first extent, fetching the first extent from the first extent part identified using the first count and extent addresses specified within the first extent identifier in the first tuple mapped to the first source name of the first extent.

2. The method of claim 1, comprising:
reorganizing the first extent and the second extent within the single destination extent.

3. The method of claim 1, wherein the maintaining comprises:
associating the first extent and the second extent with separate sub-extents of the single destination extent.

4. The method of claim 1, comprising:
reorganizing the single destination extent by removing unused portions of the single destination extent.

5. The method of claim 1, comprising:
maintaining a reference count for each sub-extent of the single destination extent to track a number of references to each sub-extent.

6. The method of claim 5, wherein a first reference count of a first sub-extent and a second reference count of a second sub-extent indicate that a number of references to the first sub-extent is greater than a number of references to the second sub-extent.

7. The method of claim 1, comprising:
compressing the single destination extent as a compressed extent.

8. The method of claim 7, comprising:
reorganizing the compressed extent by removing unused portions of the compressed extent and rewriting the single destination extent based upon the compressed extent.

9. The method of claim 8, wherein the rewriting comprises:
rewriting the compressed extent as an uncompressed destination extent.

10. The method of claim 1, wherein the first extent and the second extent were deduplicated at the second file system by use of sharing data extents among a plurality of logical containers, and the method further comprising preserving a result of the sharing when storing the first extent and the second extent at the first file system.

11. The method of claim 1, comprising:
utilizing the mapping to extract at least one of the first extent or the second extent from the single destination extent for client access.

12. The method of claim 11, comprising:
receiving the first source name and the second source name in a metadata stream.

13. The method of claim 12, wherein the metadata stream includes metadata indicative of logical offsets within a file at which the first extent and the second extent are stored in the second file system.

14. A computing device, comprising:
a memory comprising machine executable code having stored thereon instructions; and
a processor coupled to the memory, the processor configured to execute the machine executable code to cause the processor to:
receive, by a first file system from a second file system, a first extent and a second extent, the first extent having a first size used by the second file system to store extents;
store the first extent and the second extent into a single destination extent having a second size, larger than the first size, and used by the first file system to store destination extents;
maintain a mapping to map:
a first source name of the first extent to a first tuple comprising a first extent identifier and a first extent part of the single destination extent used to store the first extent, wherein the first extent identifier specifies a first count and extent addresses of extent parts of the single destination extent; and
a second source name of the second extent to a second tuple comprising the first extent identifier and a second extent part of the single destination extent used to store the second extent; and
in response to a lookup for the first extent, fetch the first extent from the first extent part identified using the first count and extent addresses specified within the first extent identifier within the first tuple mapped to the first source name of the first extent.

15. The computing device of claim 14, wherein the machine executable code causes the processor to:
reorganize the first extent and the second extent within the single destination extent.

16. The computing device of claim 14, wherein the machine executable code causes the processor to:
associate the first extent and the second extent with separate sub-extents of the single destination extent.

17. The computing device of claim 14, wherein the machine executable code causes the processor to:
reorganize the single destination extent by removing unused portions of the single destination extent.

18. The computing device of claim 14, wherein the machine executable code causes the processor to:
maintain a reference count for each sub-extent of the single destination extent to track a number of references to each sub-extent.

19. The computing device of claim 18, wherein a first reference count of a first sub-extent and a second reference count of a second sub-extent indicate that a number of references to the first sub-extent is greater than a number of references to the second sub-extent.

20. A non-transitory computer-readable medium having stored thereon instructions which when executed by a machine, causes the machine to:
receive, by a first file system from a second file system, a first extent and a second extent, the first extent having a first size used by the second file system to store extents;

store the first extent and the second extent into a single destination extent having a second size, larger than the first size, and used by the first file system to store destination extents; and maintain a mapping to map:
- a first source name of the first extent to a first tuple comprising a first extent identifier and a first extent part of the single destination extent used to store the first extent, wherein the first extent identifier specifies a first count and extent addresses of extent parts of the single destination extent; and
- a second source name of the second extent to a second tuple comprising the first extent identifier and a second extent part of the single destination extent used to store the second extent; and in response to a lookup for the first extent, fetch the first extent from the first extent part identified using the first count and extent addresses specified within the first extent identifier within the first tuple mapped to the first source name of the first extent.

\* \* \* \* \*